(12) United States Patent
Yao et al.

(10) Patent No.: US 11,726,566 B1
(45) Date of Patent: Aug. 15, 2023

(54) MEMBRANES WITH REDUCED RESISTIVITY

(71) Applicant: META PLATFORMS TECHNOLOGIES, LLC, Menlo Park, CA (US)

(72) Inventors: Li Yao, Redmond, WA (US); Tianshu Liu, Redmond, WA (US); Harsha Prahlad, Redmond, WA (US); Priyanshu Agarwal, Kirkland, WA (US); Daniele Piazza, Redmond, WA (US); Dongsuk Shin, Seattle, WA (US); Zhenzhen Shen, Kirkland, WA (US); Wenyang Pan, Redmond, WA (US); Felippe Jose Pavinatto, Lynnwood, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/725,521

(22) Filed: Apr. 20, 2022

Related U.S. Application Data

(60) Provisional application No. 63/179,823, filed on Apr. 26, 2021.

(51) Int. Cl.
*G06F 3/01* (2006.01)
*C08F 214/22* (2006.01)
*C08F 214/24* (2006.01)
*C08L 27/16* (2006.01)

(52) U.S. Cl.
CPC ............ *G06F 3/014* (2013.01); *C08F 214/22* (2013.01); *C08F 214/242* (2013.01); *C08L 27/16* (2013.01); *G06F 3/016* (2013.01)

(58) Field of Classification Search
None
See application file for complete search history.

(56) References Cited

U.S. PATENT DOCUMENTS

2017/0308204 A1* 10/2017 Frey ..................... G06F 3/0445
2021/0316446 A1* 10/2021 Leroy ..................... G06F 3/014

* cited by examiner

*Primary Examiner* — Carl Adams
(74) *Attorney, Agent, or Firm* — Greenberg Traurig, LLP

(57) ABSTRACT

Disclosed apparatus may include a membrane, a first electrode supported by the membrane, a second electrode, and optionally a controller configured to control an electrical potential applied between the first electrode and the second electrode. Example apparatus may include one or more flexible membranes that may, at least in part, define an enclosure that is at least partially filled with a dielectric fluid. A flexible membrane may include a functionalized polymer or inorganic dielectric material, such as a fluoropolymer composite including at least one electrically conductive additive and/or at least one toughener. Examples also include associated materials (e.g., polymers), methods of fabrication, methods of apparatus operation, and systems.

20 Claims, 21 Drawing Sheets

PVDF

P(VDF-TrFE) Copolymer

PVDF     PTrFE

P(VDF-CTFE-TrFE) Copolymer

P(VDF-CTFE-TrFE)

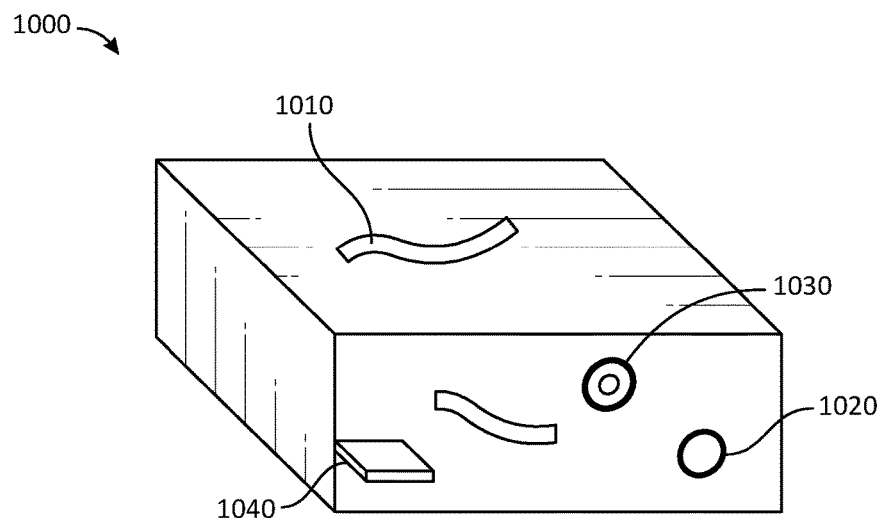
FIG. 10
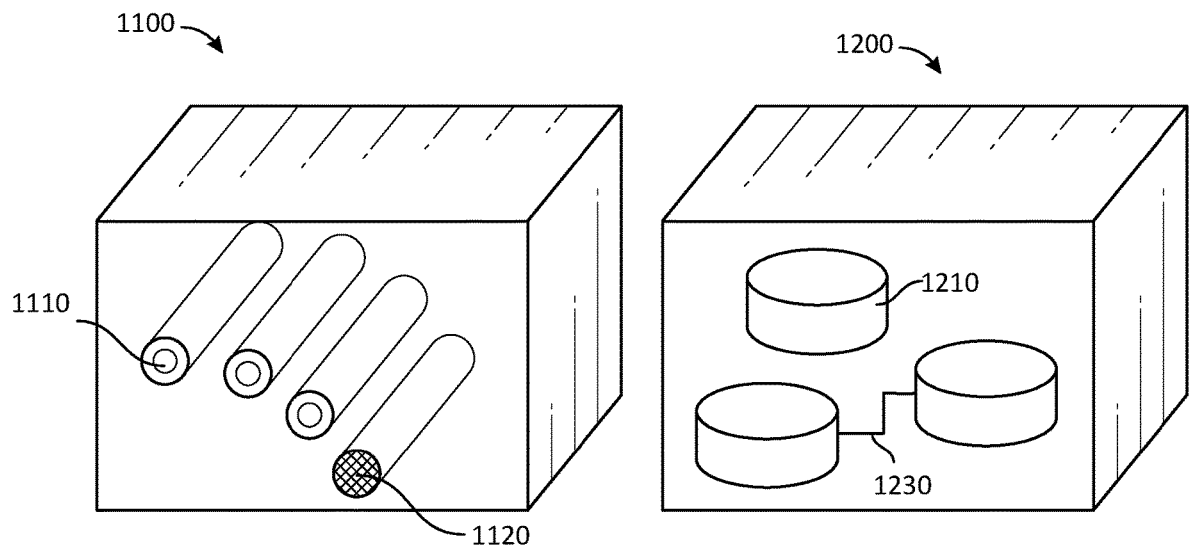
FIG. 11  FIG. 12

MEMBRANES WITH REDUCED RESISTIVITY

CROSS REFERENCE TO RELATED APPLICATION

This application claims the benefit of U.S. Provisional Application No. 63/179,823, filed Apr. 26, 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 10 illustrates example additives that may be included within a membrane material, in accordance with various embodiments.

FIG. 11 illustrates example nanotube and/or nanorod additives that may be included within a membrane material, in accordance with various embodiments.

FIG. 12 illustrates example disc-like additive shapes that may be included within a membrane material, in accordance with various embodiments.

Figure 1:
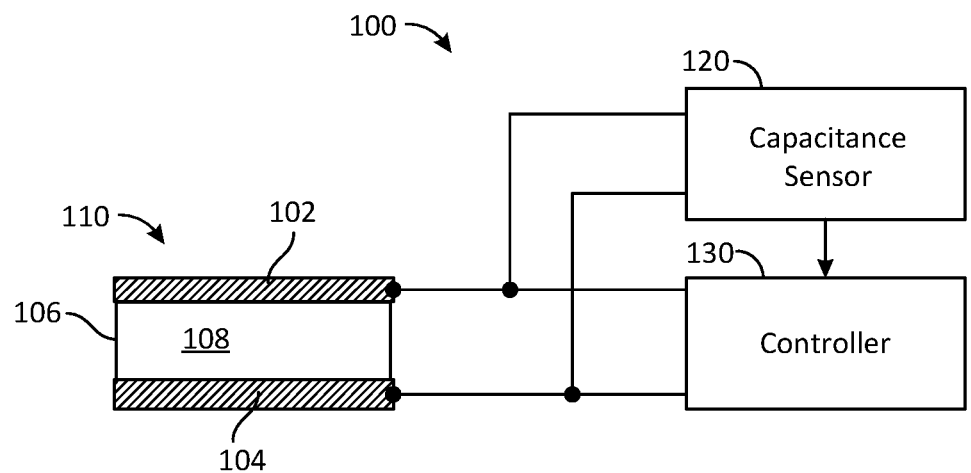
FIG. 1 illustrates a transducer system in accordance with various embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure covers all modifications, equivalents and alternatives falling within the scope of the appended claims.

DETAILED DESCRIPTION OF EXEMPLARY EMBODIMENTS

The present disclosure is generally directed to transducers, such as actuators (e.g., haptic devices) and/or sensors. In some examples, an apparatus may include a membrane, a first electrode supported by the membrane and a second electrode. In some examples, a dielectric fluid may be located within a fluid enclosure at least partially defined by the membrane. An example apparatus may also include a controller that may be configured to apply an electrical potential between the first electrode and the second electrode.

In some examples, the membrane may include a dielectric material and an electrically conductive additive. In some examples, the electrically conductive additive may include at least one of a metal, an electrically conductive metal oxide, carbon, or an electrically conductive polymer. An electrically conducting additive may be in the form of at least one of fibers, flakes, rods, or particles. A membrane may have a volume resistivity of between $10^8$ ohm.cm and $10^{12}$ ohm.cm, such as between $10^9$ ohm.cm and $10^{11}$ ohm.cm. In some examples, an apparatus such as an actuator may include a haptic device that may be configured to provide a user-perceptible haptic signal (e.g., including vibration, pressure, or other mechanical displacement). Example apparatus may include one or more membranes having modified tensile strength and/or electrical conductivity. Examples also include methods of fabrication of membranes and apparatus, methods of operation and example apparatus including example membranes, for example, including dielectric membranes and/or polymer membranes.

As is explained in greater detail below, embodiments of the present disclosure may include virtual and/or augmented reality (AR/VR) devices. An example apparatus may provide improved haptic feedback and/or improved sensing of user input, such as touch-based inputs. Example applications of the same include augmented reality and/or virtual reality (AR/VR) devices.

In some examples, membranes may include dielectric layers, polymers, polymer blends, or polymer composites. A dielectric layer may include one or more dielectric materials, such as an inorganic dielectric material. In some examples, a membrane may include a polymer. Examples further include polymer films, their methods of fabrication, polymer membranes and devices including such polymer membranes.

In some examples, an apparatus may include a membrane having slight (e.g., non-zero) membrane conductivity that may help dissipate charges accumulated by electrical double layer formation proximate one or more electrodes. In some examples, a membrane may be located between an electrode and dielectric fluid enclosed within a transducer. Specific configurations and conductivity ranges are described in detail below. In some examples, a membrane having a slight electrical conductivity may include a membrane material (e.g., a polymer) and an electrically conductive material. A membrane may include a dielectric material and an electrically conductive material as an additive to the dielectric material. Example electrically conductive materials may include one or more of a metal (e.g., particles, wires, nanowires, and the like), electrically conductive metal oxide, carbon (e.g., graphite, graphene, or carbon nanotubes), semiconductor, conductive polymer, or other suitable electrically conductive material.

In some examples, a membrane material may include an additive that modifies the mechanical properties of the membrane. In some examples, a membrane may include a toughener, such as an additive that confers additional toughness to the membrane. In some examples, a membrane (e.g., a polymer membrane) may be strengthened by including inelastic fibers in the membrane.

Examples may include a device including at least one membrane. An example membrane may include a dielectric material (e.g., an inorganic material, polymer, or other material). Example membranes may include a polymer composite including at least one dielectric material and at least one electrically conductive additive and/or chemical derivative.

Figure 15:
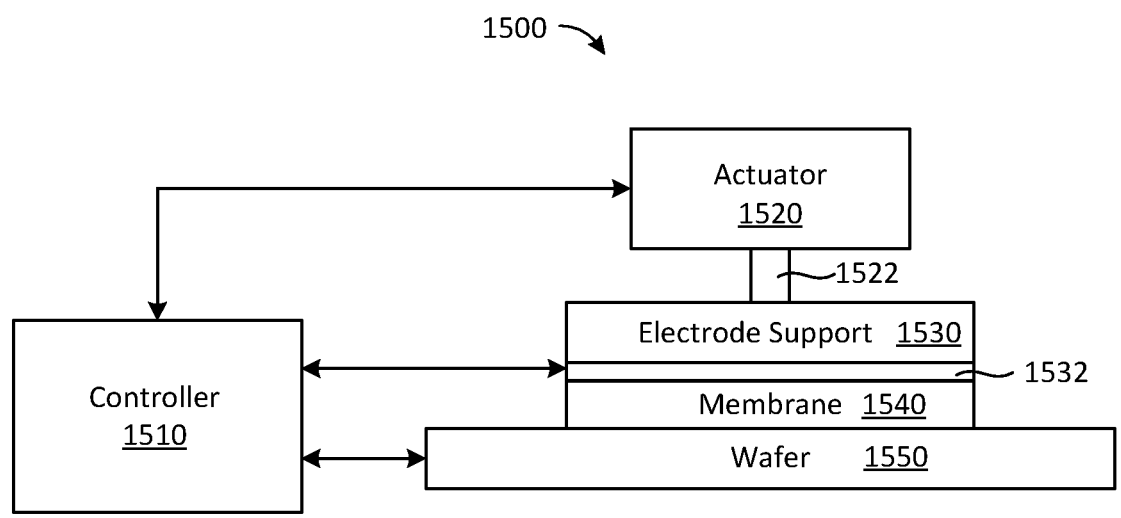
FIG. 15 shows a portion of an example electroadhesion apparatus, in accordance with various embodiments.
Figure 16:
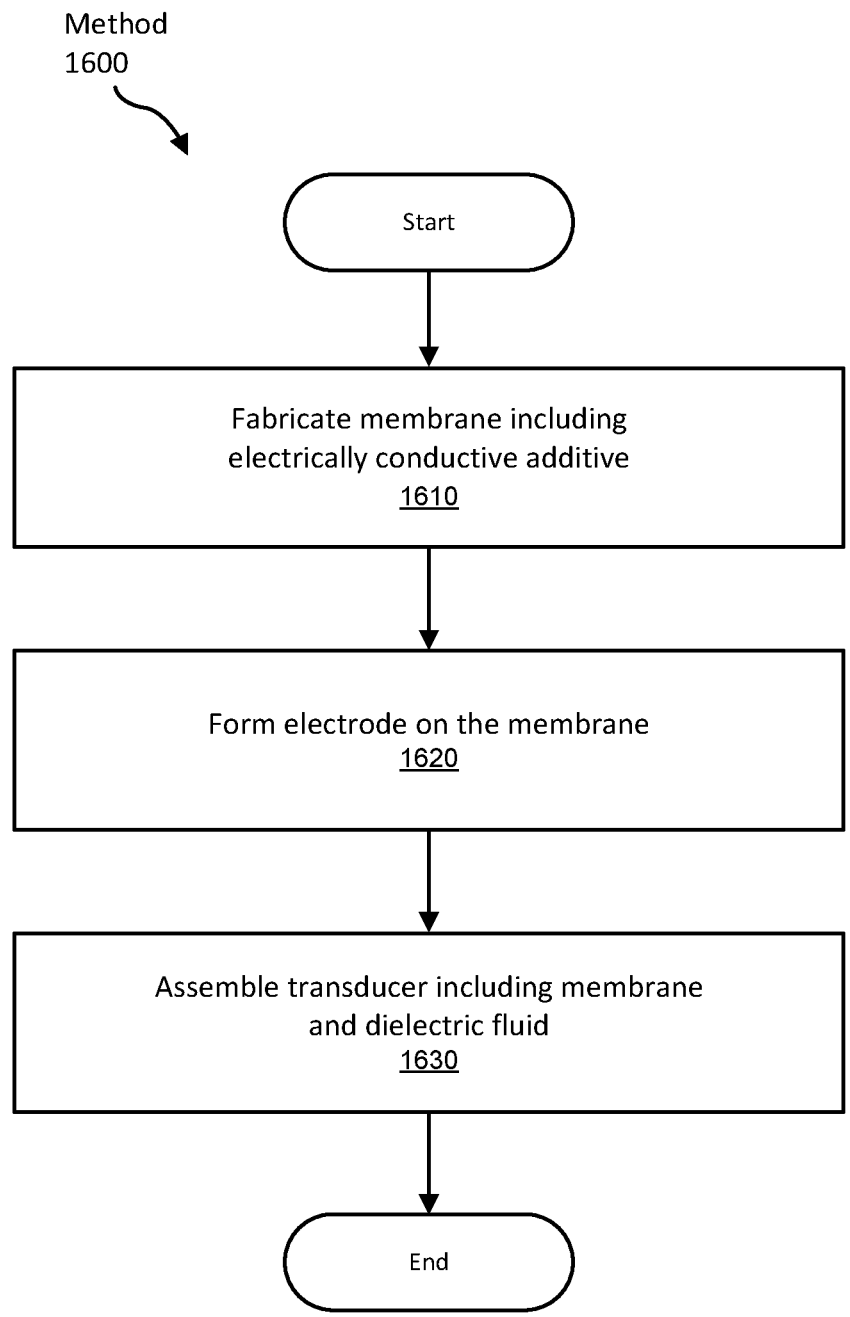
FIG. 16 illustrates an example method of fabricating a transducer, in accordance with various embodiments.
Figure 17:
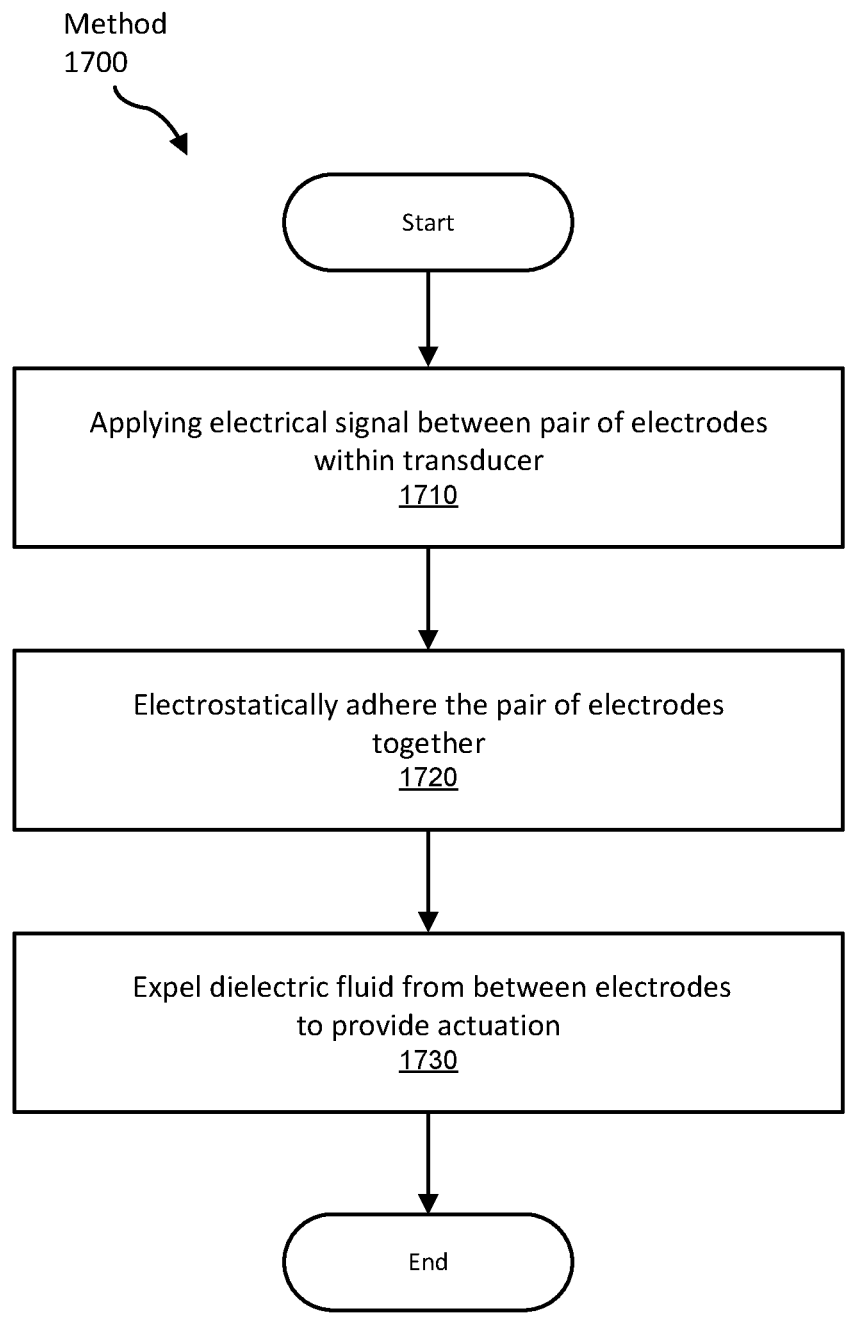
FIG. 17 illustrates an example method of operating an actuator, in accordance with various embodiments.
Figure 18:
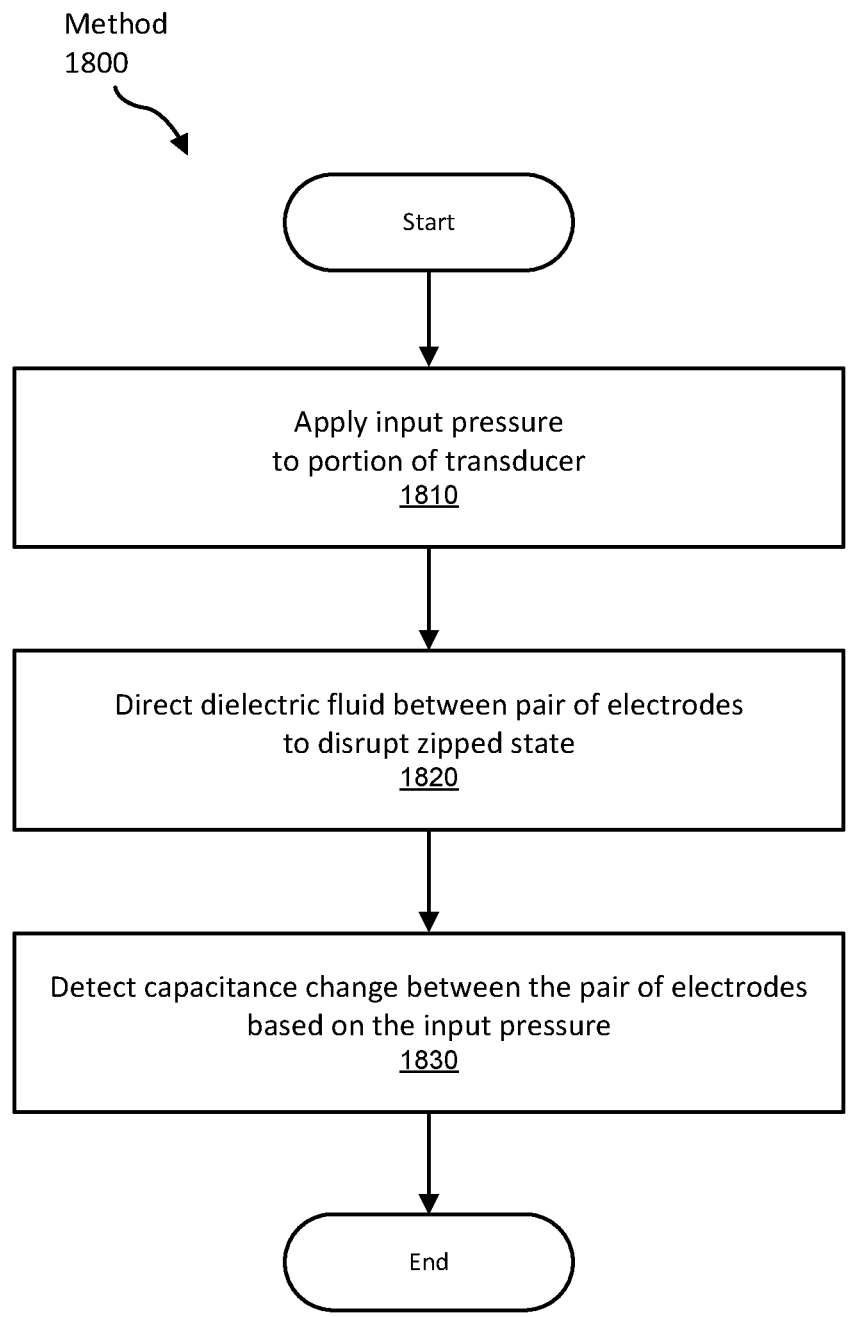
FIG. 18 illustrates an example method of operating a sensor, in accordance with various embodiments.

The following provides, with reference to FIGS. 1-23, detailed descriptions of example embodiments. FIGS. 1-3 illustrate example apparatus including haptic devices and/or sensors. FIGS. 4A-5C illustrate charge diffusion and charge double layer formation and diffusion. FIGS. 6A-8B illustrate further haptic devices and/or sensors. FIGS. 9A-9C illustrate example polymers, and FIGS. 10-14 illustrate example additives that may be included within a membrane. FIG. 15 shows a portion of an example electroadhesion apparatus. FIGS. 16-18 illustrate example methods of apparatus fabrication and operation. FIGS. 19-23 illustrate example augmented reality and virtual reality systems.

Applications may include apparatus including membranes as described herein, including transducers such as actuators and/or sensors. Example transducers may include electrostatic membrane-based actuators and/or sensors, such as an actuator including at least one membrane, at least one electrode and, in some examples, a dielectric fluid as described in more detail below. Example apparatus may operate as actuators and/or sensors. Example sensors may include touch sensors or other sensors providing a change in at least one parameter (e.g., an electrical parameter such as capacitance between electrodes) in response to a mechanical input.

An example apparatus may include a transducer, such as an actuator (e.g., a haptic device), a sensor, or a system including a transducer and additional components, such as an AR/VR (augmented reality and/or virtual reality) device including a controller operable to control at least one haptic device and/or receive sensor signals from at least one sensor.

In some examples, a membrane may include a dielectric material, for example, a solid dielectric layer, for example, a polymer such as a fluoropolymer, such as poly(vinylidene difluoride) (PVDF) or a PVDF-based polymer such as poly(vinylidene difluoride-trifluoroethylene-chlorotrifluoroethylene (PVDF-TrFE-CTFE). Example polymers are discussed in more detail below. An example membrane may have reduced resistivity and/or improved toughness, for example, using one or more additives and/or one or more modifications of the polymer. In some examples, a membrane such as a polymer layer may be fabricated by an ink coating process using an ink including the polymer along with additional materials, such as additional polymers, polymer segments or functional additives, conductive additives (such as particles or intrinsically conductive polymers), tougheners, plasticizers, or other additives. Example polymers may include fluoropolymers, such as a polymer or co-polymer of one or more halogenated ethenes (e.g., PVDF, a PVDF-TrFE copolymer, a PVDF-TrFE-CTFE copolymer, or a derivative thereof such as a tetrapolymer).

FIG. 1 illustrates an example apparatus including a transducer such as an actuator and/or sensor. Apparatus 100 includes a transducer 110 including first electrode assembly 102, second electrode assembly 104, edge seal 106 and dielectric fluid 108. The apparatus further includes a capacitance sensor 120 and a controller 130. The dielectric fluid 108 may be enclosed within a fluid volume defined, at least in part, by the first electrode assembly 102 and the second electrode assembly 104, and optionally by at least one edge seal such as edge seal 106. The controller may be configured to apply electrical signals to electrodes within the first electrode assembly 102 and the second electrode assembly 104. The capacitance sensor 120, which in some examples may be integrated with the controller 130, may provide a capacitance signal to the controller 130. In some examples, the capacitance signal may be correlated with the configuration of at least one membrane assembly.

An example actuator may include first and second membranes enclosing a dielectric fluid (e.g., an ester oil or methoxy-substituted fluoropentane). In some examples, electrodes may be located within a peripheral region of each membrane. In some examples, an electrode may be embedded within a membrane or located on an outer surface of the membrane (relative to the dielectric fluid) so that at least a portion of the membrane is located between the electrode and the dielectric fluid. In some examples, a membrane portion may be located between the electrode and the dielectric fluid.

Figure 2A:
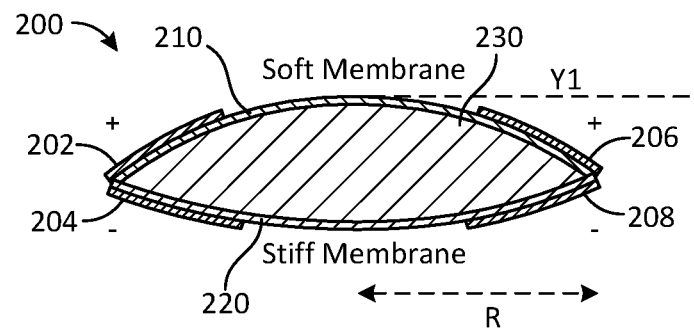
FIGS. 2A-2B illustrate haptic devices in accordance with various embodiments.
Figure 2B:
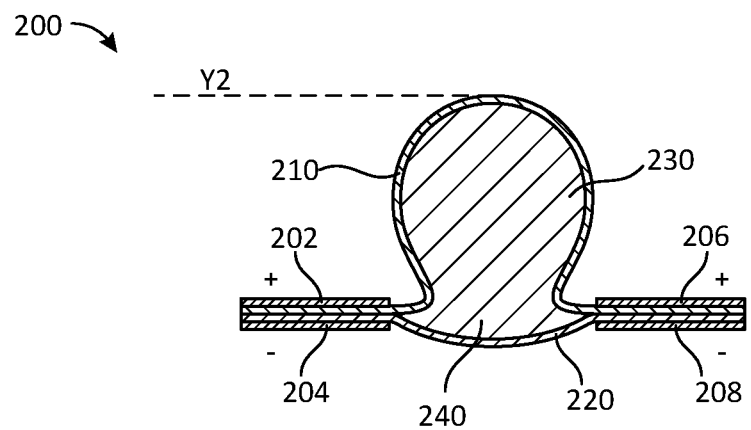
Figure 3:
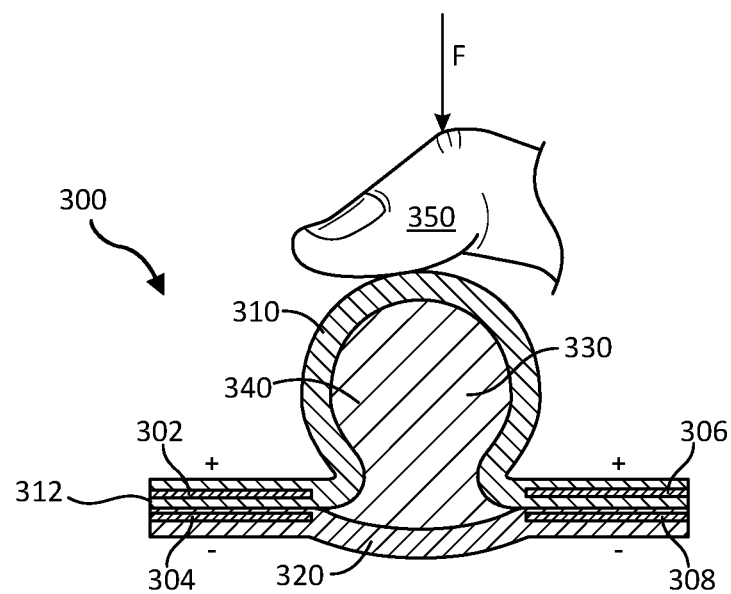
FIG. 3 illustrates a pressure sensor in accordance with various embodiments.

FIGS. 2A-2B illustrate a cross-section of an example actuator, such as a haptic device. An example apparatus may include a generally circular, oval, or otherwise shaped actuator.

FIG. 2A shows an example apparatus 200 configured as an actuator including first electrode 202, second electrode 204, third electrode 206, fourth electrode 208, upper membrane 210, lower membrane 220 and dielectric fluid 230. The apparatus 200 is shown in a configuration where the electrostatic attraction between the first and second electrodes, and also between the third and fourth electrodes, is insufficient to draw the electrodes together into what may be termed a zipped state. The formation of zipped states is discussed further below.

FIG. 2B shows the example apparatus 200 with the two pairs of electrodes in a zipped state. The electrostatic attraction between a first pair of electrodes (first electrode 202 and second electrode 204) and a second pair of electrodes (third electrode 206 and fourth electrode 208) is sufficient to bring the respective pairs of electrodes together into the zipped state, in which electrostatic attraction between the electrodes brings them into proximity and may exclude substantially all dielectric fluid between the membrane assemblies.

In forming the zipped state, dielectric fluid may be expelled from between the respective pairs of electrodes into a central region 240. The additional dielectric fluid in the central region may cause one or both of the membranes to bulge outwards. Upper membrane 210 is indicated as a soft membrane and lower membrane 220 is indicated as a stiff membrane. These terms may be relative to each other, so that the upper membrane 210 (indicated as a soft membrane) is deformed more by an increase in internal pressure of the dielectric fluid 230 than the lower membrane 220 (indicated as a stiff or rigid membrane). This configuration may be advantageous if membrane deformation is perceived by the user for the upper membrane 210. In FIG. 2B, the lower membrane 220 is shown having some curvature outwards due to the raised internal pressure of the dielectric fluid 230. In some examples, the lower membrane 220 may show no appreciable deformation, or be replaced by a rigid substrate, enabling a greater deformation of the upper membrane 210.

An example membrane (e.g., of a transducer such as an actuator or a sensor) may include a membrane material, such as a dielectric solid such as a polymer or other membrane material. In some examples, a first membrane (e.g., the upper membrane 210 as illustrated in FIG. 2A) may include a relatively soft membrane and a second membrane (e.g., the lower membrane 220 of FIG. 2A) may include a relatively stiff membrane. The terms soft and stiff may be relative terms indicating that the soft (e.g., less rigid) membrane may be distended more by an increase in pressure of the dielectric fluid within the central region of the actuator, compared to the stiff membrane. The equation for force may approximate the approximate electrostatic force between the electrodes for lower electrode separations.

In some example haptic devices, a tactile haptic sensation may be experienced by a user on one side of the actuator (in the illustrated example, the top side). The membrane on the top side of the actuator may have a lower stiffness (e.g., a reduced elastic constant for deformation) compared to the membrane or other substrate on the lower side of the actuator. The membrane having a lower stiffness may then bulge out more, for example, compared to a configuration in which both membranes are equally soft. Membrane deformation may arise from an increased internal pressure of the dielectric fluid as generating the zipped state tends to reduce the interior volume of the dielectric fluid. However, a dielectric fluid (e.g., a dielectric liquid) may be generally incompressible, so that the dielectric fluid expelled from between the membrane assemblies may result in an increase in volume of another region of the device.

The apparatus 200 shown in FIGS. 2A and 2B may be configured as an actuator, and in some examples may be used as a haptic device. The apparatus 200 may include a wearable apparatus. In some examples, membrane distension may be perceived by a person when the person is wearing the device, for example, after application of an electrical signal between at least one pair of electrodes so as to induce electrostatic attraction between the pair of electrodes.

In some examples, FIGS. 2A and 2B may show a cross-section through a circular apparatus, though other configurations are possible. In some examples, the upper or lower membranes may have a radius of between 2 mm and 50 mm in a non-distended state. In some examples, the distension of at least one membrane may be in the range of 1 mm-10 mm (e.g., in a direction parallel to an optic axis of the lens), though this and other ranges are exemplary, may be inclusive, and range end points may be approximate. Configurations shown are exemplary and not limiting. In some examples, a device may include a first membrane and a second membrane, and a toughener may be added to at least one of the membranes to increase the stiffness of the membrane. In some examples, a first membrane (that may be labeled as the soft membrane) may be configured to distend outwardly more after formation of a zipped state or other type of actuated state, and the amount of toughener in the first membrane may be less than in a second membrane which distends outwards less compared to the first membrane under similar conditions.

In some examples, the second membrane may be omitted, and a transducer may include a first electrode, a membrane, a dielectric fluid, a substrate and a second electrode. The dielectric fluid may be located within a fluid enclosure at least partially defined by the membrane and the substrate. The substrate may include a rigid layer and may include an optically transparent polymer. The membrane may be located between the first electrode and the dielectric fluid and may include a conductive additive and/or a toughener. The second electrode may be located on the substrate. In some examples, an electrically conductive layer may be located on the second electrode. The substrate may be rigid, so that any deformation due to changes in the dielectric fluid pressure (e.g., due to formation of a zipped state) results in appreciable deformation of the membrane and no appreciable deformation of the substrate. In some examples, an appreciable deformation of a membrane may include a displacement of at least 0.5 mm, a change in optical power of at least 0.05 diopters, or other user-perceptible change in a mechanical, optical and/or electrical parameter.

FIG. 3 illustrates an example apparatus including a transducer that may be similar in configuration to the actuator discussed above in relation to FIGS. 2A and 2B, but may be configured as a pressure sensor. FIG. 3 shows apparatus 300 including first electrode 302, second electrode 304, third electrode 306, and fourth electrode 308 configured as first and second pairs of electrodes, here illustrated in a zipped state with dielectric fluid generally excluded between the respective electrodes. The apparatus 300 further includes upper membrane 310, lower membrane 320 and dielectric fluid 330. In the zipped configuration shown, the dielectric fluid 330 may be expelled from between each pair of electrodes and substantially completely contained within a central portion 340 of the device. In this example, the upper membrane 310 may be designated as a soft membrane as discussed above in relation to FIG. 2. The dielectric fluid expelled from between the pairs of electrodes into the central region may cause the upper membrane 310 to bulge outwards.

In this example, the electrodes are embedded within a respective membrane. For example, first electrode 302 is embedded within upper membrane 310 so that a membrane portion 312 is located between the electrode and the lower surface (as illustrated) of membrane 310. In some examples, only a membrane portion such as membrane portion 312 has a reduced resistivity. In some examples, the entire upper membrane 310 may have a reduced resistivity. In some examples, the membrane portion 312 may be formed after the deposition of the first electrode 302 on upper membrane 310. In some examples, membrane portion 312 may be an essentially separate layer from upper membrane 310 and may include a layer deposited on the first electrode after deposition of the first electrode.

Application of a force (denoted by the arrow labeled "F") to the central portion 340 of the apparatus 200 by finger 350 (or by any other object) may force dielectric fluid between the zipped electrode assemblies and may result in an unzipped state similar to that discussed above in relation to FIG. 2A. The capacitance between respective pairs of electrodes may be appreciably less in the unzipped state, for example, due to the greater distance between the electrodes.

Apparatus 300 may be used as a touch sensor where a touch input is detected by a change (e.g., decrease) in capacitance between at least one pair of electrodes. In some examples, an apparatus may include a plurality of pairs of electrodes and these electrode pairs may unzip together or, in some examples, in sequence allowing a determination of input pressure and/or input speed (e.g., rate of change of applied pressure versus time). In some examples, a controller may be configured to apply an electrical signal between a pair of electrodes and the applied voltage (e.g., to restore a pair of electrodes to a zipped state) may be used as a measure of input pressure.

Figure 4A:
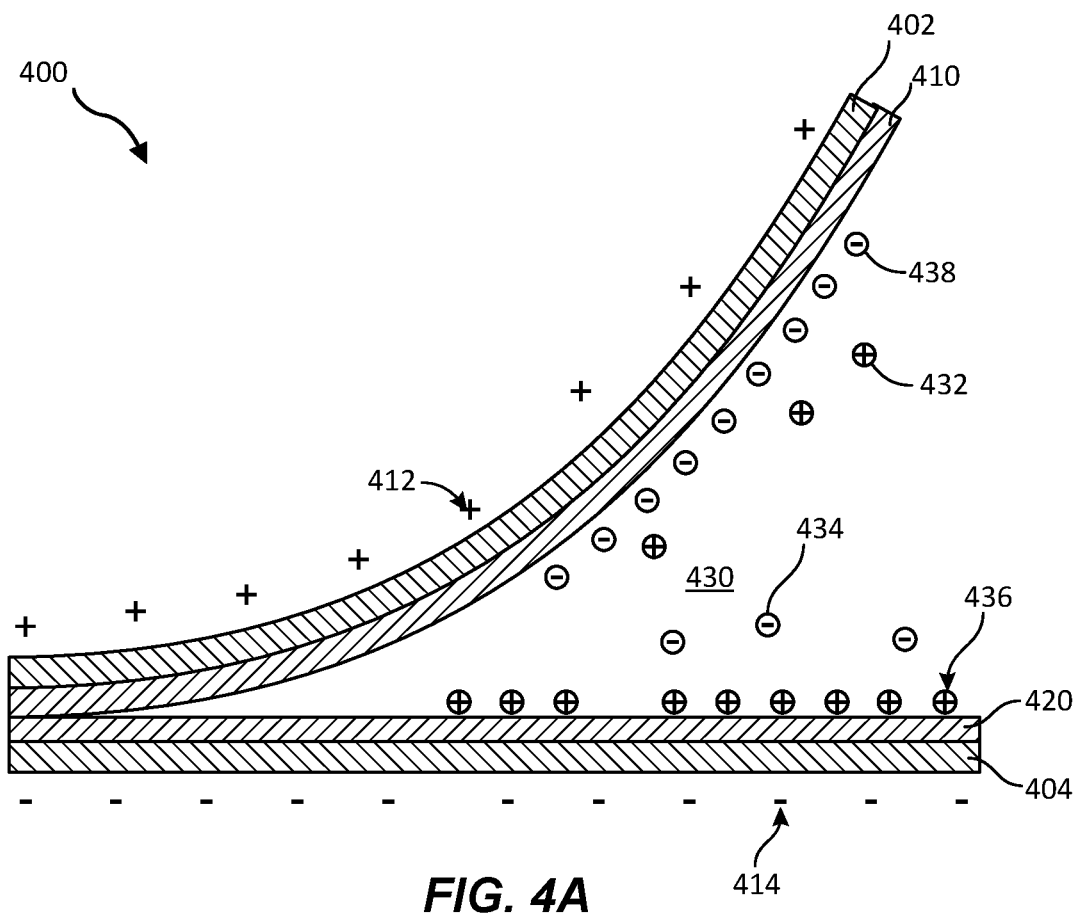
FIGS. 4A-4B show a cross-section of a transducer and an associated time scale of charge diffusion, in accordance with various embodiments.

FIG. 4A illustrates the formation of a charge double layer and shows a portion of an apparatus 400 including a first electrode 402, second electrode 404, first membrane 410 and second membrane 420. The positive charge symbols 412 represent a positive electric potential applied to the first electrode and the negative charge symbols 414 represent a negative charge applied to the second electrode. Negative charges 438 (e.g., negative ions within the dielectric fluid 430) may be electrostatically attracted towards and accumulate near the first electrode and positive charges 436 may accumulate near the second electrode. A charge double layer may be created near the first electrode as positive charges 432 may then be attracted to the accumulated negative charges, such as negative charge 438. Similarly, negative charges such as negative charge 434 may be attracted to the accumulated positive charges including positive charge 436. The accumulation of charges and the potential formation of an electric double layer may electrostatically shield the charge on the first electrode from the opposite charge on the second electrode, resulting in a reduction in the electrostatic attraction between the oppositely charged electrodes. This may result in higher operating voltages being required for a given degree of actuation.

The electrostatic charges on the electrodes may attract oppositely charged ions in the dielectric fluid to the opposite side of the membrane. This charged layer may counteract the electrical potential applied between the electrodes. In some examples, the electric double layer may reduce the electrostatic attraction sufficiently that the electrostatic attraction is reduced and dielectric fluid re-enters a space between the electrodes. This process is called "unzipping" and in this context may be a problem preventing proper functioning of an actuator. In this context, unzipping of a pair of electrodes may include the introduction of the dielectric fluid in at least a portion of the volume between the electrodes. This may result, for example, from an input pressure applied to a portion of the apparatus, such as a portion of a membrane.

Figure 4B:
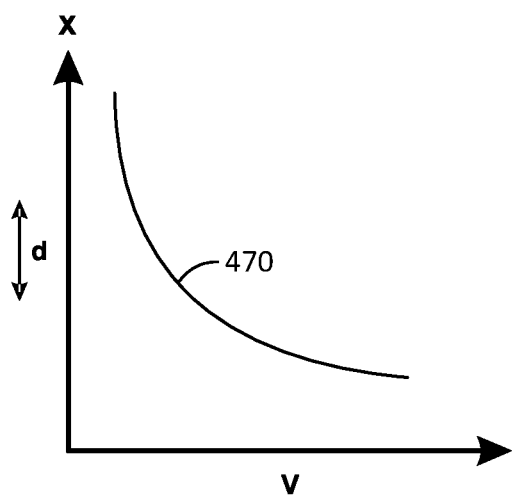

FIG. 4B is a qualitative representation of the variation of charge double layer thickness (X) versus applied potential (V) between the electrodes, shown as curve 470. The charge double layer thickness may be lower for higher voltages and may vary over a range denoted "d".

Figure 5A:
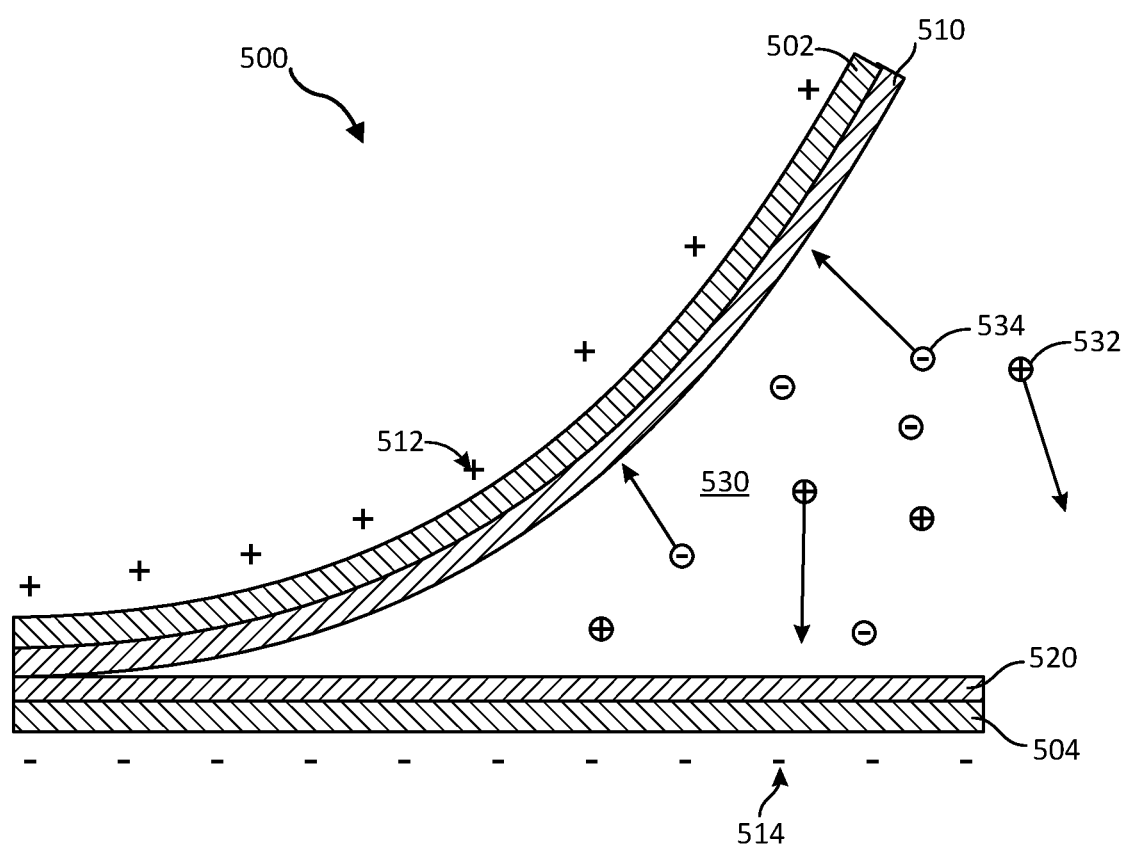
FIGS. 5A-5C show a cross-section of a transducer and charge diffusion effects in accordance with various embodiments.
Figure 5B:
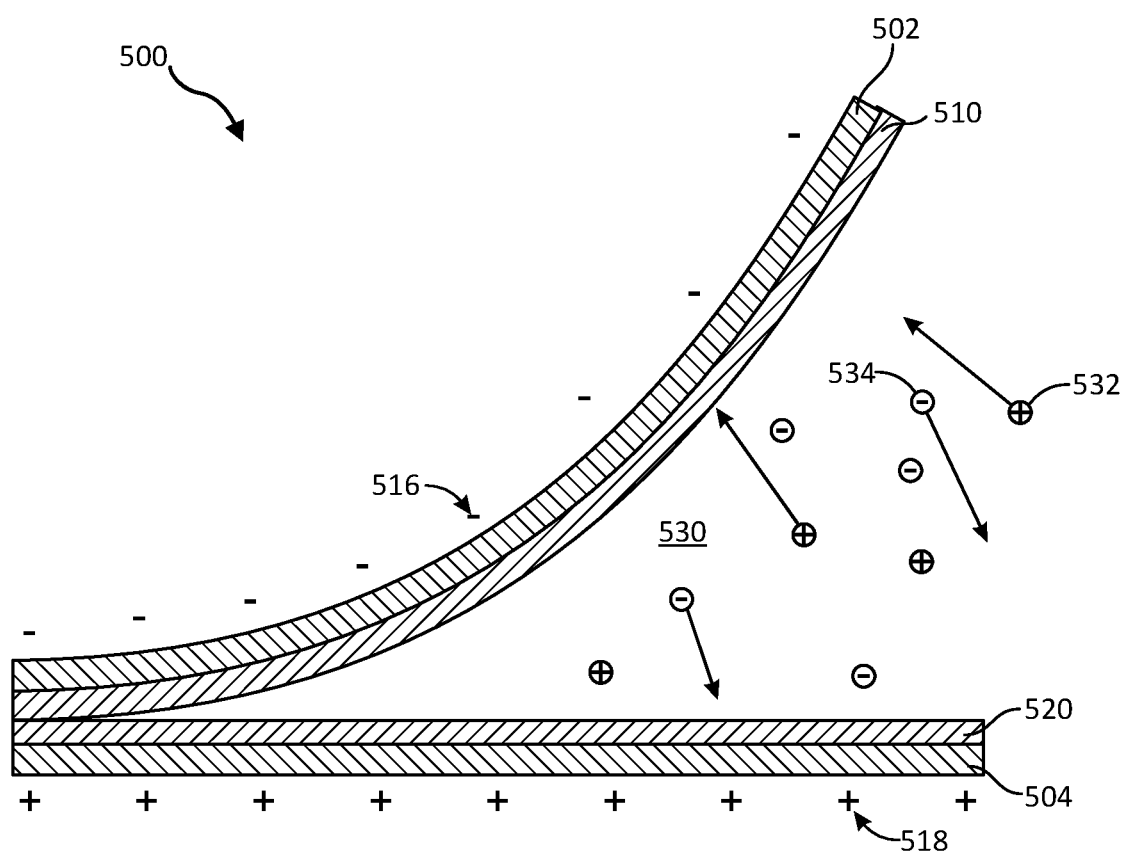
Figure 5C:
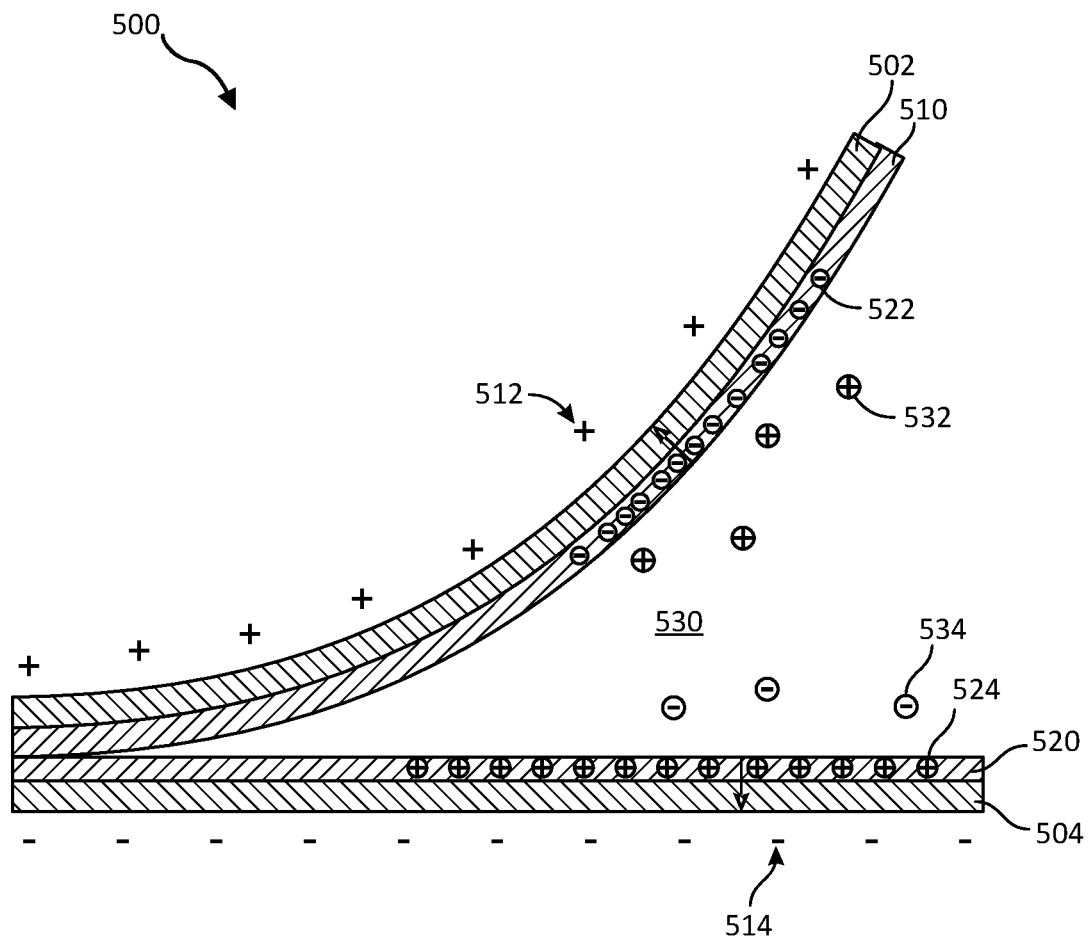

FIGS. 5A-5C further illustrate diffusion of ions, for example, within the dielectric fluid during formation of the electric double layer.

FIG. 5A further illustrates the diffusion of ions within a dielectric fluid 530, for example, during formation of an electric double layer. FIG. 5A shows a portion of an apparatus 500 including a first electrode 502, second electrode 504, first membrane 510, second membrane 520, positive charges 512 representing a positive electric potential applied to the first electrode 502 and negative charges 514 representing a negative charge applied to the second electrode 504. The application of an electrical signal between the first and second electrodes induces motion of negative ions 534 within dielectric fluid 530 towards the first electrode 502. In some examples, negative ions may include electrons, and indicated motion of positive ions may correspond to movement of electrons in the opposite direction. Similarly, positive ions 532 within dielectric fluid 530 may be attracted to the second electrode 504. The migration of charges may electrostatically shield the electrical potential on the first electrode from the opposite electrical potential on the second electrode, resulting in a reduction in the electrostatic attraction between the oppositely charged electrodes and may require a higher operating voltage.

FIG. 5B shows the effect of a polarity reversal of the electrical signal applied between the first electrode 502 and second electrode 504. The motion directions of positive ion 532 and negative ion 534 are reversed and these ions may then migrate towards the electrode having an opposite polarity from the respective ions. For example, positive ions move towards negative charges 516 on the respective electrode.

The time for double layer formation ($t_S$) may be approximated by:

$$t_S = \rho_L Q/E \qquad \text{(Equation 1)}$$

where $\rho_L$ represents the resistivity of the dielectric fluid (e.g., a liquid), Q represents charge and E represents the electric field (e.g., in volts/meter).

In some examples, as shown by FIGS. 5A and 5B, an alternating signal may be applied to the electrodes. The alternating signal may have a frequency high enough that a charge layer is not formed during a single time period of any particular polarity. For a signal frequency f, the time period (e.g., for sequential application of alternating polarities) is 1/f. Hence, charge layer formation may be avoided if:

$$1/f < t_S \qquad \text{(Equation 2)}$$

The dissipation time ($t_D$) for the charge layer may be given by:

$$t_D = \rho_D Q/E \qquad \text{(Equation 3)}$$

The charge layer may diffuse through a mechanism including electric conductivity (or, equivalently, resistivity) and/or ion conductivity in the adjacent membrane. The diffusion time of the charge layer may be related to the resistivity of the dielectric membrane, so that $\rho_D$ may denote the membrane resistivity.

The ratio between the dissipation time and the formation time may be given by:

$$t_D/t_S = \rho_D/\rho_L \qquad \text{(Equation 4)}$$

Here, $\rho_D/\rho_L$ may represent the ratio of the dielectric resistivity to the liquid resistivity. If the membrane resistivity is reduced, the dissipation time is also advantageously lowered. Hence, in some examples, the membrane resistivity may be reduced, for example, to a value less than that of the resistivity of the dielectric fluid. Specific value ranges are discussed further below.

The diffusion of ions within the dielectric fluid may be a dynamic process. In some examples, an alternating potential may be applied between the electrodes that has a time period less than the diffusion time of the ions (e.g., to form the electric layer), which may help reduce electric double layer formation.

FIG. 5C shows the portion of the apparatus with the signal applied to the first and second electrodes being similar to that discussed above in relation to FIG. 5A. After a charge layer forms near the electrodes, negative charges such as negative charges 522 diffuse through the first membrane 510 to the first electrode 502 (here, a positive electrode) and positive charges such as 524 diffuse through second membrane 520 to the second electrode 504 (here, a negative electrode). In this example, the resistivities of the membranes may be reduced, for example, by inclusion of one or more electrically conductive additives, as discussed in further detail below. These processes allow dissipation of any charge layer that may build up near the first and/or second electrode (such as an electric double layer) by electrical conduction through the membrane.

Without charge layer diffusion, positive charges such as positive ion 532 may become attracted to a negative charge layer accumulated proximate the first membrane 510 adjacent the first electrode 502. The reduced electrical resistivity of the first membrane 510 may allow the negative charge layer to diffuse away (and, e.g., be neutralized by charge transfer at the first electrode) before positive charges such as positive ion 532 are attracted to the negative charge layer to form an electric double layer proximate the first membrane 510. Similarly, diffusion of positive charges 524 through the second membrane 520 may prevent a charge double layer forming proximate the second membrane 520.

In some examples, a diffusion of positive ions may be supplemented by diffusion or other conductive process for electrons in the opposite direction.

In some examples, the first and/or second membrane may include a polymer membrane and/or another dielectric membrane. By reducing the resistivity of the membrane (e.g., a dielectric layer such as a polymer membrane) charge layer dissipation may be enhanced. Higher membrane resistivities may reduce dielectric loss and leakage currents in capacitive applications. However, reduction of the effects of charge layer formation by reducing membrane resistivity may provide significant advantages.

In some device applications, improved performance may be obtained by lowering the volume resistivity (sometimes termed the bulk resistivity) of the dielectric membrane. The electric double layer may be removed or appreciably reduced (e.g., dissipated) by allowing electrical conductivity between the inner surface of the membrane (e.g., that may be in contact with the dielectric fluid) and the outer surface of the membrane (e.g., in contact with an electrode). If the time scale required to dissipate electrical charges is shorter than the time scale for electrical double layer formation, the electric double layer may not have enough time to form.

Figure 6A:
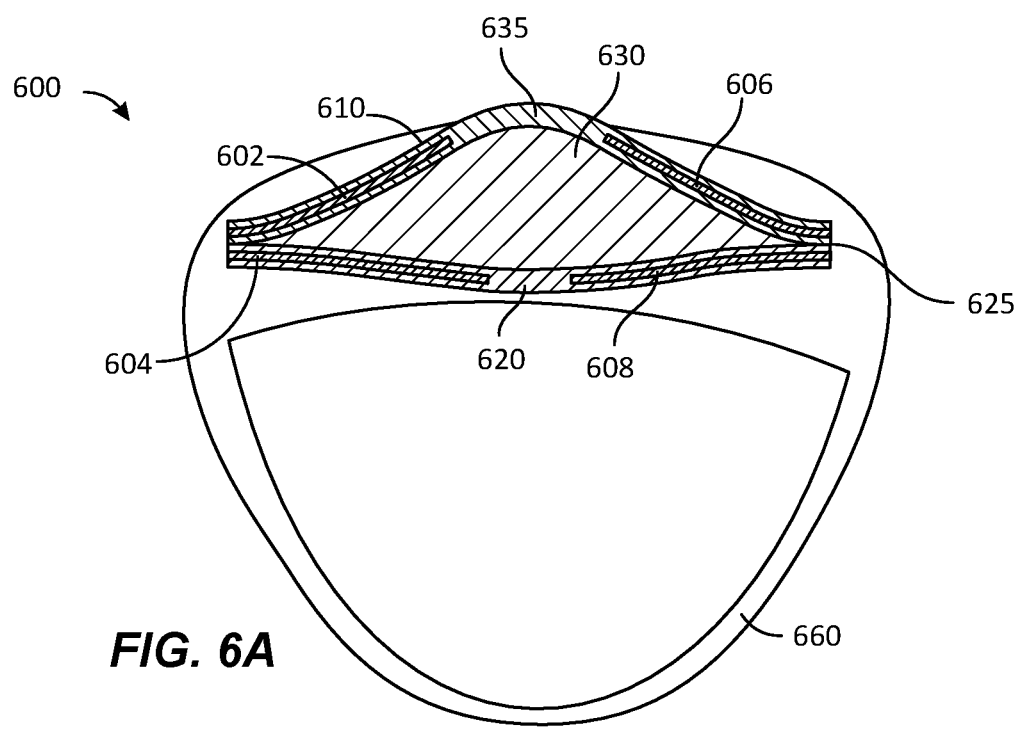
FIGS. 6A-6B illustrate further haptic devices in accordance with various embodiments.
Figure 6B:
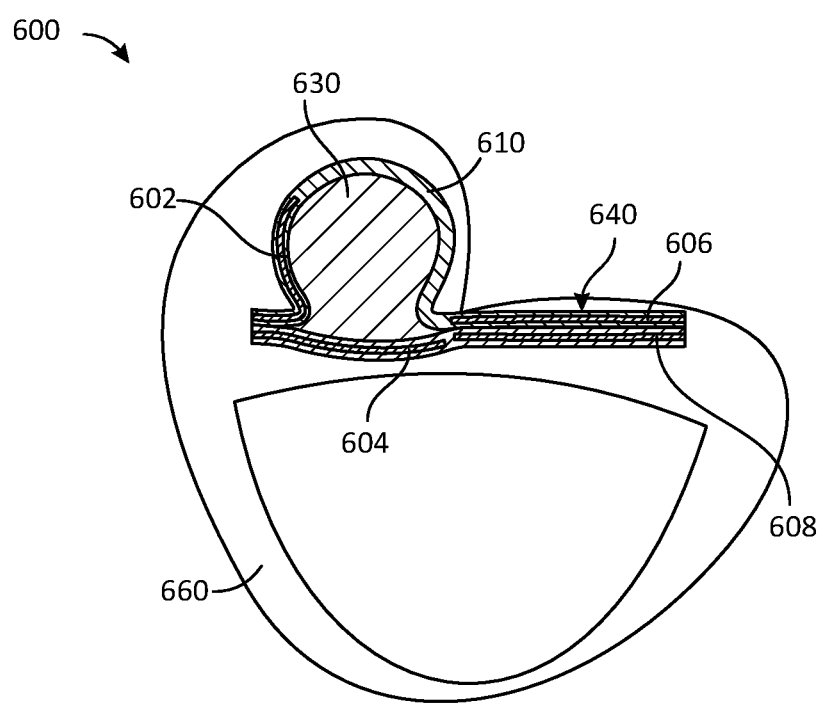

FIGS. 6A and 6B show an example apparatus including membranes capable of forming a zipped state.

FIG. 6A shows apparatus 600 including strap 660 that may allow the apparatus to be worn by a user. The apparatus 600 includes first electrode 602, second electrode 604, third electrode 606, fourth electrode 608, first membrane 610 and second membrane 620. There is a gap 635 between the two pairs of opposed electrodes, the first pair of electrodes (first electrode 602 and second electrode 604) and the second pair of electrodes (third electrode 606 and fourth electrode 608). The membranes may be adhered together within an edge portion 625, or in some examples may be interconnected by an edge seal of any suitable type. The dimensions of the electrodes and the gaps may be any suitable dimension and the FIGS. 6A and 6B are qualitative and illustrative in nature. In FIG. 6A, any electrical signal applied between the first or the second pairs of electrodes is insufficient to induce a zipped state.

FIG. 6B shows the apparatus 600 in which the second pair of electrodes (606 and 608) form a zipped state. The electrostatic attraction between the second pair of electrodes is sufficient to expel dielectric fluid 630 from between the second pair of electrodes so that the second pair of electrodes achieves the zipped state 640. The first pair of electrodes are not in zipped state and dielectric fluid 630 tends to accumulate in the left hand portion of the apparatus 600 as illustrated.

In some examples, an electrical potential applied between first and second electrodes may induce an electrical polarization in the weakly electrically conductive membrane. The electrical polarization may enhance the electrostatic attraction between the weakly electrically conductive layer and the second electrode or any layer thereon. The weakly electrically conductive membrane also helps dissipate electrical double layer formation within the dielectric fluid that may otherwise reduce any electrostatic attraction.

Further, by alternating which of the first and second pairs of electrodes is in the zipped state, motion of the dielectric fluid in a back-and-forth lateral flow pattern may be achieved. This may be used to obtain particular types of haptic feedback.

Figure 7A:
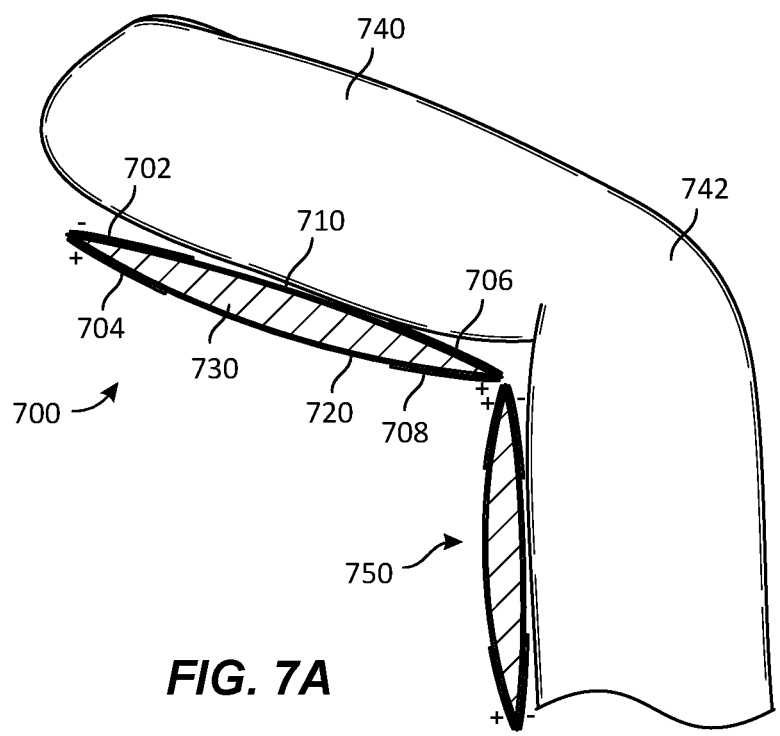
FIGS. 7A-7B illustrate further haptic devices and/or sensors in accordance with various embodiments.
Figure 7B:
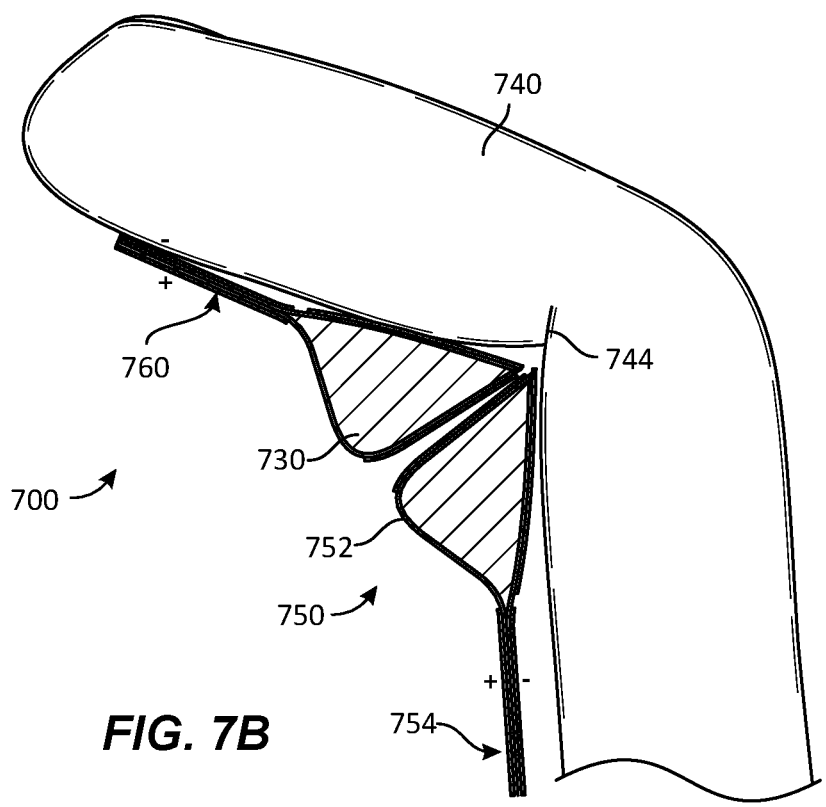

FIGS. 7A and 7B show an example apparatus (e.g., a sensor and/or actuator) including membranes and electrodes that may form a zipped state.

FIG. 7A shows an apparatus including a first transducer 700 and a second transducer 750 supported within the joint 742 of a finger 740. The first transducer 700 includes a first electrode 702, second electrode 704, third electrode 706 and fourth electrode 708, arranged as a first pair of electrodes (first electrode 702 and second electrode 704) and a second pair of electrodes (third electrode 706 and fourth electrode 708). The first transducer also includes first membrane 710 and second membrane 720 enclosing dielectric fluid 730. Second transducer 750 may have a similar structure to first transducer 700 and is not discussed here in detail.

FIG. 7B shows the first and second electrodes in a zipped state 760, in which the dielectric fluid 730 tends to be expelled from the zipped state and induces dilation of the remainder of the device including the second pair of electrodes. Similarly, the second transducer 750 includes electrodes in a zipped state 754, so that the remainder of the device (752) tends to bulge out.

The apparatus shown in FIGS. 7A-7B may be configured as a transducer and/or a sensor. For example, a controller (not shown) may be used to apply an electrical signal between pairs of electrodes to achieve a zipped state and this may provide particular haptic signals that may be discerned by the user. Further, an electrical signal may be used to provide resistance to bending of a finger joint. In some examples, the bending angle at the inside of the finger joint 744 may be determined by an apparatus configured as a sensor. For example, the area of any zipped state within the apparatus may be sensitive to both the electrical signals applied by a controller to respective pairs of electrodes within the transducers and the bending angle of the finger joint.

Figure 8A:
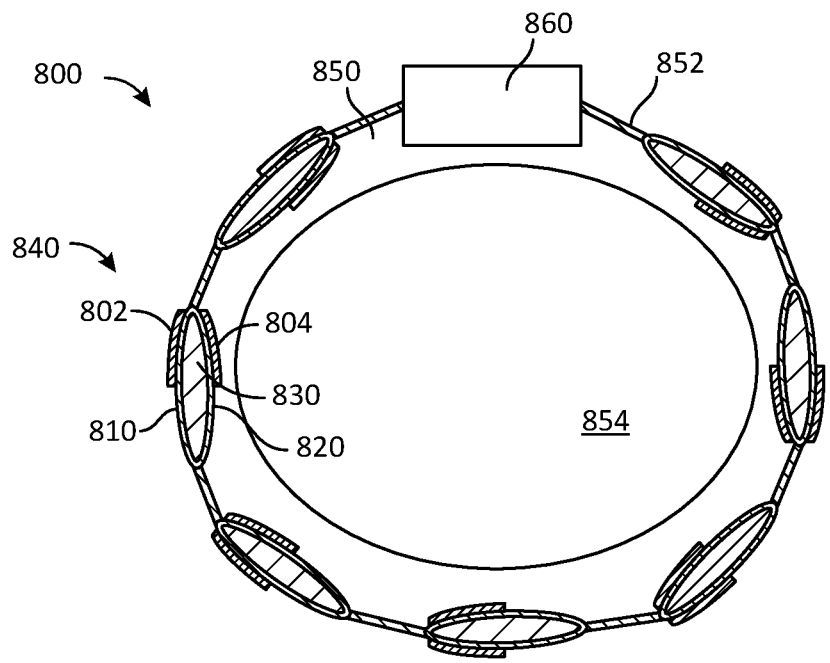
FIGS. 8A-8B illustrate further haptic devices in accordance with various embodiments.
Figure 8B:
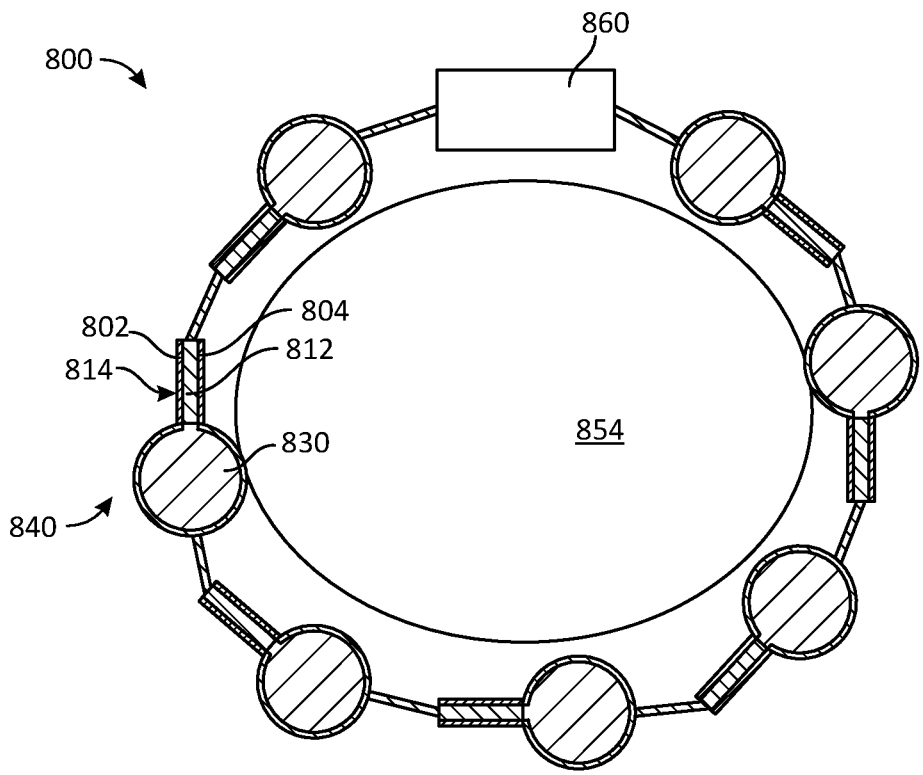
Figure 9A:
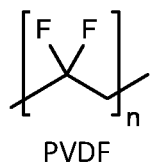
FIGS. 9A-9C illustrate example polymers that may be included in a membrane, in accordance with various embodiments.
Figure 9B:
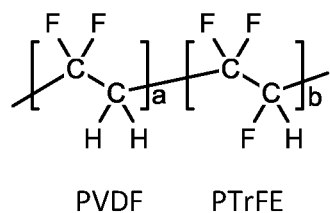
Figure 9C:
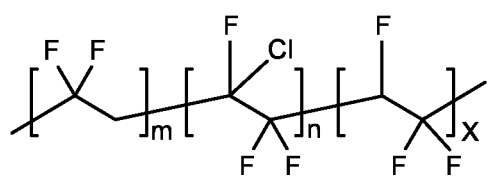

FIGS. 8A and 8B show an example apparatus including an arrangement of transducers including membranes and electrodes that may provide a zipped state.

FIG. 8A shows apparatus 800 including a plurality of transducers such as transducer 840. Transducer 840 includes a first electrode 802, second electrode 804, first membrane 810, second membrane 820 and a dielectric fluid 830. The transducers may be arranged around a strap 850, for example, a wrist strap, having an opening 854. The strap may also include a controller 860 and an electrical connector 852, not shown in detail, that may provide electrical connections between the controller and various electrodes of the arrangement of transducers.

FIG. 8B shows the first electrode 802 and second electrode 804 in a zipped state 814, in which the electrodes are separated by a dielectric layer 812 including portions of the first and second membranes shown in FIG. 8A. The dielectric fluid may be expelled from the zipped state to induce expansion of the lower portion of the transducer 840. This may provide a perceptible haptic sensation to a user when the user wears the apparatus, for example, by inserting a body part such as the wrist through the opening 854 of the strap 850.

In some examples, a membrane may include a polymer. In some examples, a membrane may include a fluoropolymer, such as poly(vinylidene difluoride) (PVDF) or other similar, analogous, or derivative polymer. Example fluoropolymers may include polymers of vinylidene difluoride (or its derivatives and analogs) and/or one or more other monomer species, such as one or more other vinylidene halides (e.g., a vinylidene fluoride (VDF) and/or a vinylidene chloride). Monomer species may be based on a vinyl monomer and include one or more halide atoms, such as fluorine and/or chlorine.

FIG. 9A shows poly(vinylidene difluoride) or PVDF, sometimes referred to as poly(1,1-difluoroethylene). A membrane may include PVDF and/or one or more other polymers, for example, as a polymer blend. The integer n may be any suitable value, may represent the degree of polymerization, and may represent a median or mean value.

In some examples, a fluoropolymer may include poly(vinylidene trifluoride) or PVTrF, sometimes referred to as poly(trifluoroethylene) or PTrFE. In some examples, a fluoropolymer may include poly(vinylidene chlorotrifluoride) or PVCF, sometimes referred to as polychlorotrifluoroethylene (PCTFE).

In some examples, a polymer may be a polymer of vinylidene fluoride (VDF) and one or more other fluorinated and/or non-fluorinated polymerizable moieties (e.g., monomers).

FIG. 9B shows a copolymer of vinylidene difluoride and vinylidene trifluoride, sometimes referred to as a P(VDF-TrFE) copolymer. The integers a and b may be any suitable value and may represent a median or mean value. In some examples, a and b may be approximately equal, for example, equal within 10%.

FIG. 9C shows a terpolymer of vinylidene difluoride, vinylidene trifluoride and vinylidene chlorotrifluoride, sometimes referred to as a P(VDF-TrFE-CTFE) copolymer. The figure, as illustrated, is designated as P(VDF-CTFE-TrFE) and for illustrative clarity the protons may not be illustrated. Different monomer types may be arranged within a polymer backbone in a random order, as blocks, or in any other suitable arrangement. In this example, the illustrated order of monomers is not significant and the polymer structure may include any appropriate arrangement of monomers. The integers m, n and x may be any suitable value and may each represent a median or mean value for a bulk material. In some examples, a, b and x may be approximately equal, for example, equal within 10%.

In this context, the term copolymer may include polymers of 2, 3, 4 or more different monomer species. In some examples, the polymer moieties based on different monomer species may be randomly distributed along a polymer chain. The term copolymer may include terpolymers. In some examples, a copolymer may include block copolymers that may include sequences of repeated polymer moieties based on the same monomer species.

PVDF-TrFE-CTFE is an example material that has some properties useful for use as a dielectric membrane, such as a high relative dielectric constant, for example, a relative permittivity of greater than 20, and in this example polymer a relative permittivity of greater than 40. However, PVDF-TrFE-CTFE relatively soft and may be easy to tear, thus making it difficult to handle as a free-standing film (e.g., as a membrane). Another problem faced by conventional electrostatic zipping actuators is that, with most dielectric fluids, electrical double layers may form after applying a voltage to the electrodes of the electrostatic zipping actuator, which may reduce the electrostatic attractions that allow the zipped state to form. This may cause problematic un-zipping of the electrostatic zipping actuator, where un-zipping may include a movement of electrodes away from each other and ingress of dielectric fluid between the electrodes or layers attached thereto. Reducing the volume resistivity of the membrane to obtain a slight conductivity may, however, help dissipate the charges contributing to the electrical double layer, thus reducing or eliminating the unzipping problem.

FIG. 10 is a simplified schematic illustrating example additives that may be included in a membrane. The representative portion of membrane 1000 includes various additive forms, such as fiber 1010, particle 1020, core-shell particle 1030 (where the particles are shown illustratively in cross-section) and flake 1040. Example additives may include fibers, rods, particles, core-shell particles, rings, disks, other flakes and/or other forms of additive. Example additives may include a solid material such as a polymer, an inorganic material (such as a ceramic, glass, or form of carbon), dielectric solid (e.g., a metal oxide), or any other suitable material. Fibers may be flexible or rigid. Conductive additives may include any such form and may include an electrically conductive material such as a metal, carbon, conductive metal oxide, ionomer, doped semiconductor, semimetal, or conductive polymer. Tougheners (additives added to improve the mechanical stability of the membranes) may include dielectric materials. In some examples, an additive may act both as an electrically conductive polymer and a toughener (e.g., electrically conductive polymers, nanorods, and the like).

FIG. 11 is a simplified schematic illustrating further example additives that may be included in a membrane. The representative portion of membrane 1100 includes elongated elements such as tubes 1110 and rods 1120. Elongated elements (such as tubes or rods) may include a form of carbon (e.g., carbon nanotube, carbon fiber, and the like), a dielectric solid (e.g., a ceramic rod, nanorod, or nanotube), or other material.

FIG. 12 is a simplified schematic illustrating further example additives that may be included in a membrane. The representative membrane portion 1200 includes disks 1210 (such as any disk-like element) such as solid disks, polyaromatic materials, and the like. In some examples, disk-like or rod-like elements may be flexibly interconnected. For example, two neighboring disks may be interconnected by a chemical chain such as chemical chain 1230 (e.g., a flexible chain such as an alkyl chain). The chemical chain 1239 may adopt a generally linear or curved conformation.

Figure 13:
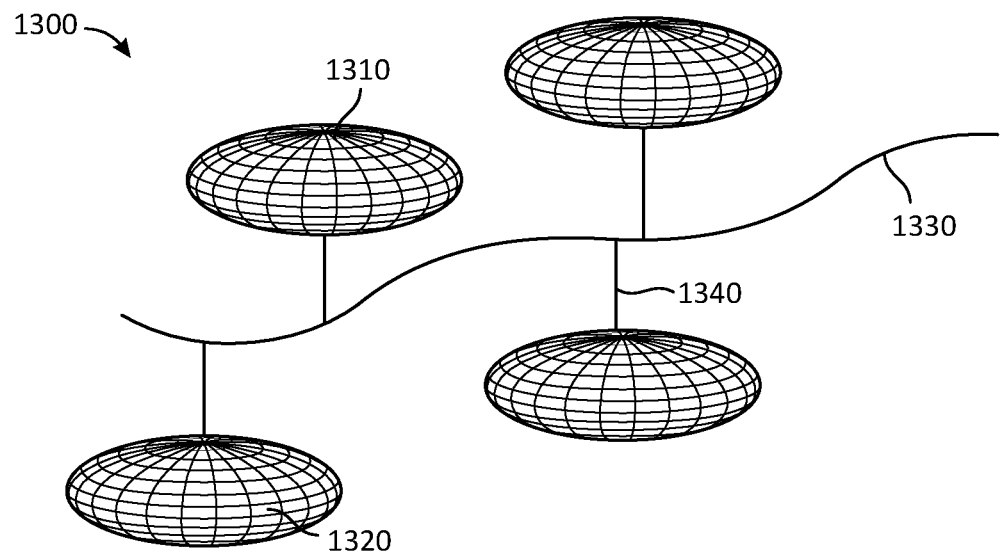
FIG. 13 illustrates example side-chain additive moieties that may be included within a membrane material, in accordance with various embodiments.

FIG. 13 schematically illustrates a membrane portion 1300 including oblate spheroids (e.g., disks) 1310 and 1320 that may be interconnected by a polymer chain 1330 and side chains 1340 interconnecting the polymer chain 1330 and the disks. The main chain or side chain may be rigid or flexible. In some examples, some or all of the disks may be replaced by prolate spheroids. The polymer chain 1330 may extend through a matrix material (e.g., a dielectric material) to form a membrane material.

Figure 14:
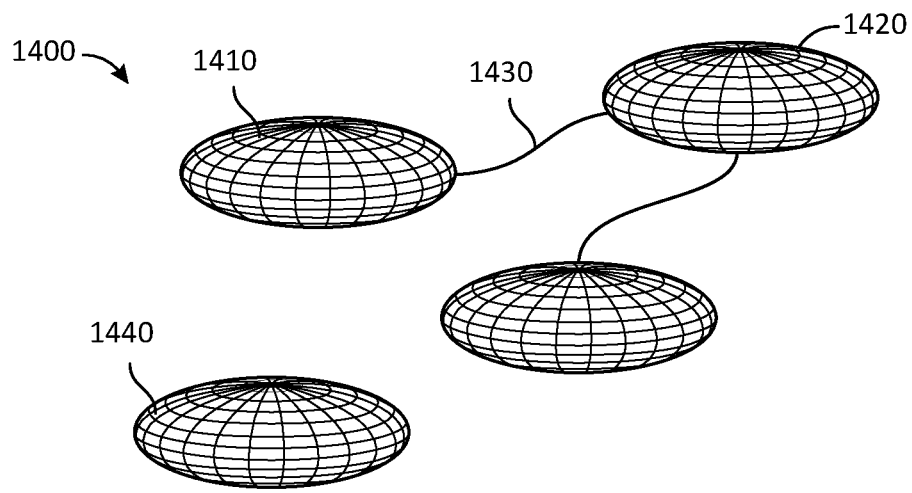
FIG. 14 illustrates example interconnected additive moieties that may be included within a membrane material, in accordance with various embodiments.

FIG. 14 schematically illustrates a membrane portion 1400 including oblate spheroids (e.g., disks) 1410 and 1420 that may be interconnected by a linker chain 1430. Some oblate spheroids, such as oblate spheroid 1440, may be unconnected to others. In some examples, some or all of the oblate spheroids may be replaced by prolate spheroids. The linker chain 1430 may extend through a matrix material (e.g., a dielectric material) to form a membrane material.

FIG. 15 shows an example apparatus 1500 including a controller 1510, actuator 1520, actuator connector 1522, electrode support 1530, electrode 1532, and membrane 1540. In this example, the wafer 1550 is an object to be moved. The controller may be configured to apply an electrical signal (e.g., a direct or alternating electric potential) between the electrode and the wafer. The membrane may have a slight electrical conductivity that helps dissipate electric double layers and may increase the electrostatic attraction between the apparatus and the wafer. The apparatus 1500 may be an electroadhesion apparatus and may be configured to lift and move the wafer, using electroadhesion (controlled by the controller) and the actuator. Any object with a surface conforming or conformable to the membrane lower surface may be manipulated by an apparatus of this example configuration.

Examples include methods of fabricating membranes having a reduced electrical resistivity and, in some examples, increased toughness.

FIG. 16 illustrates an example method of fabricating a transducer, in accordance with various embodiments. The example method (1600) includes fabricating a membrane including an electrically conductive additive (1610), forming an electrode on the membrane (1620) and assembling a transducer including the membrane and a dielectric fluid (1630), where at least a portion of the membrane is located between the electrode and the dielectric fluid. In some examples, the membrane may include a dielectric material such as a polymer or other dielectric material, and may be fabricated to further include a toughener. In some examples, the membrane may be fabricated by forming a composite including at least one polymer and at least one electrically conductive additive. The transducer may include a second electrode supported by a substrate such as a second membrane.

An example membrane may include a polymer, such as a fluoropolymer, for example, PVDF-TrFE-CTFE (poly(vinylidene difluoride-trifluoroethylene-chlorotrifluoroethylene). In some examples, the term copolymer may include terpolymers, tetrapolymers, or other polymers formed from two or more monomer species. In some examples, a polymer may include PVDF, poly(VDF-TrFE) copolymer, poly(VDF-CTFE) copolymer, or other fluorinated or otherwise halogenated polymer. Polymers may be chemically modified, formed into a polymer blend (e.g., with one or more additive polymers), or used as a polymer composite (e.g., including one or more additives. In some examples, the term polymer may include polymer blends, copolymers, polymer derivatives and/or polymer composites.

In some examples, a membrane may include a polymer, such as a fluoropolymer, for example, a polyvinyldifluoride (PVDF) based polymer. Example polymers may include PVDF, PVDF derivatives and analogs, polymer blends. In some examples, a membrane may include a co-polymer of vinyl difluoride and one or more other monomers, such as trifluoroethylene (TrFE) and/or chlorotrifluoroethylene (CTFE). In this context, the term copolymer may include copolymerization products of two or more monomers, such as terpolymers, tetrapolymers, and the like. An example membrane or polymer material may include PVDF-TrFE-CTFE, or composites, analogs and/or derivatives thereof.

Example processes to fabricate polymer films (such as PVDF-TrFE-CTFE based films) may include solvent assisted processes, such as spin-coating, slot-die coating, ink-jet printing, bar-coating, aerosol jetting, screen/stencil printing, or temperature assisted processes which may include film extrusion, hot-pressing, injection molding, chemical vapor deposition, atomic layer deposition, or other process.

In some examples, a dielectric polymer composite film (such as a fluorinated polymer or PVDF-TrFE-CTFE composite film) may be fabricated using spin-coating, slot-die coating, ink-jet printing, bar-coating, aerosol jetting, screen/stencil printing, or temperature assisted processes which may include film extrusion, hot-pressing, or injection molding. In some examples, a polymer composite film may be fabricated using a solvent assisted process. For ink-based deposition, the ink may include a solvent such as methyl ethyl ketone, isopropanol, acetone, ethanol, propylene glycol methyl ether acetate, hydrofluoroether (e.g., Novec™ fluids, 3M, Maplewood, Minn.), DMF (dimethylformamide), DMSO (dimethylsulfoxide), ethyl acetate, dichloromethane, chloroform, hexane, or cyclohexane.

For solvent assisted processes, solvents may be used to dissolve the polymer (such as a functionalized PVDF-TrFE-CTFE composite). Example solvents may include methyl ethyl ketone, isopropanol, acetone, ethanol, propylene glycol methyl ether acetate, hydrofluoroether (e.g., Novec™ fluids), DMF, DMSO, ethyl acetate, dichloromethane, chloroform, hexane, cyclohexane, other suitable solvent, or any combination of these.

In some examples, the viscosity of the ink for an ink-jet based fabrication process may be below 50 mPa·s (pascal second), or below 20 mPa·s at 20-35° C.; the viscosity of the ink for spin-coating may be below 5000 mPa·s, or 3000 mPa·s, or 1500 mPa·s; the viscosity of the ink for slot-die may be below 3000 mPa·s, or 1000 mPa·s; the viscosity of the ink for solvent casting may be below 5000 mPa·s, or 3000 mPa·s; the viscosity of the ink for screen-printing may be below 50000 mPa·s, or 30000 mPa·s, or 2500 mPa·s; the viscosity of the ink for aerosol jetting may be below 3000 mPa·s, 1000 mPa·s, or 500 mPa·s. Viscosities may be determined using, for example, a rotational viscometer at a particular temperature, such as a temperature between 20° C. and 35° C., such as 25° C. Examples may also include viscosities within ranges of viscosity between any two viscosity values recited in the examples discussed above.

FIG. 17 illustrates an example method of operating a transducer in accordance with various embodiments. The example method (1700) includes applying an electrical signal between a pair of electrodes within a transducer (1710), electrostatically adhering the pair of electrodes together (1720) and expelling dielectric fluid from between the pair of electrodes to provide actuation (1730). In some examples, the actuator may include a haptic device. The pair of electrodes may have at least one membrane or a portion thereof separating them when electrostatically adhered together.

In some examples, a method of operating a transducer may include applying an electrical signal between a pair of electrodes within a transducer to induce an electrostatic attraction between the pair of electrodes, and allowing a charge double layer proximate at least one of the pair of electrodes to dissipate through charge transport between a fluid medium and the at least one of the pair of electrodes through a membrane such as described herein. In some examples, a method of operating a transducer may further include reversing the polarity of the electrical signal. In some examples, the volume electrical resistivity of the membrane is sufficiently low so as to allow the charge double layer to dissipate after application of an electrical signal and a subsequent polarity reversal of the electrical signal.

FIG. 18 illustrates an example method of operating a transducer in accordance with various embodiments. The example method (1800) includes applying an input pressure to a portion of the transducer (1810), directing displaced dielectric fluid (e.g., resulting from the input pressure) between a pair of electrodes to disrupt a zipped state of the pair of electrodes (1820) and detect a change in an electrical parameter such as a capacitance change between the pair of electrodes (1830) to provide an output signal responsive to the input pressure. The output signal may be used to control an AR/VR device. In some examples, the input force may be determined based on the capacitance change.

If the membrane resistivity is too low, the electrodes may be effectively shorted out by the membranes and the drive electronics may not function effectively. If the membrane resistivity is too high, the electric double layer may not diffuse away over a typical time scale of electrical double layer formation, and this may lead to problematic unzipping. Conductivity ranges were determined that gave good performance in electrostatic zipping actuators and these may also be valuable in various other applications.

In some examples, the volume resistivity of a polymer film (e.g., including PVDF-TrFE-CTFE film with added conductive fillers) may be in the range $10^8$ to $10^{12}$ ohm.cm. A polymer film may be used as a membrane in an electrostatic zipping actuator.

In some examples, the tensile strength of the polymer film (e.g., including PVDF-TrFE-CTFE) may be in the range 0.5 MPa to 100 MPa, and there may be elongation at break between 5% and 500%.

In some examples, a polymer (e.g., a polymer including PVDF-TrFE-CTFE) may have a high dielectric constant (such as $\varepsilon>10$), and good breakdown strength (e.g., greater than 100 V/micron).

Example processes used to form a polymer membrane (e.g., including PVDF-TrFE-CTFE) may include spin-coating, slot-die coating, ink-jet printing, bar-coating, aerosol jetting, screen/stencil printing, film extrusion, hot-pressing, injection molding, chemical vapor deposition, atomic layer deposition, or any other suitable process or combination of processes.

In some examples, a polymer membrane may have a thickness in the range of 100 nm to 1 mm, for example, between 1 micron and 500 microns.

In some examples, a polymer composite may include a matrix material (e.g., a polymer such as PVDF-TrFE-CTFE or other dielectric material) and one or more electrically conductive additives. An example conductive additive may include a conductive filler such as carbon nanotubes, carbon fibers, graphene, silver flakes, silver nanowires, gold nanowires, a combination thereof, etc. Conductive additives may include intrinsically conductive polymers/oligomers, such as a polyaniline, a polythiophene, a polypyrrole, a polyacetylene, a polyphenylene vinylene, derivatives and/or combinations thereof, or any combination of conductive polymers, for example, as polymer blends, polymer networks, or added as particles/fibers. Example conductive polymers include poly(3,4-ethylenedioxythiophene):polystyrene sulfonate (PEDOT:PSS) or poly(3-hexylthiophene-2,5-diyl) (P3HT).

In some examples, conductive additives may be present (e.g., in a polymer composite) in the range of 1 wt. % to 50 wt. %. The volume resistivity of an example polymer, polymer composite, polymer-based membrane, or other example membrane may be in the range of approximately $10^8$ ohm.cm to approximately $10^{12}$ ohm.cm. In some examples, a polymer (such as PVDF-TrFE-CTFE) may be copolymerized or grafted with additional conductive polymer blocks, where the conductive blocks may include intrinsically conductive polymers, or non-conductive polymers which may have conductive additives selectively blended in. Conductive additives and/or tougheners may be included in any dielectric membrane, including polymer-based membranes and other dielectric membranes.

In some examples, an example membrane (or membrane material such as a polymer, e.g., a composite polymer) may have a dielectric constant greater than or approximately equal to 10, such as greater than or approximately equal to 20, for example, greater than or approximately equal to 30. In some examples, an example membrane (or membrane material such as a polymer, e.g., a composite polymer) may have a breakdown strength greater than or approximately equal to 100 V/m, such as greater than or approximately equal to 200 V/m, or, in some examples, greater than or approximately equal to 500 V/m.

Polymers such as those described herein may be used to fabricate membranes in example apparatus such as described herein.

In some examples, approaches to reduce electrical resistivity (or increase electrical conductivity) of a membrane, such as a polymer membrane (such as a membrane including PVDF-TrFE-CTFE) may include addition of one or more electrically conductive additives (sometimes referred to herein as a conductive additives) to the membrane, such as addition of one or more additives a polymer.

In some examples, a conductive additive may include a conductive filler, such as particles (such as microparticles and/or nanoparticles), nanotubes, nanowires, rods, flakes, or other fillers, which may include a conducting materials such as a metal, semiconductor, conducting polymer, carbon allotrope, or other conducting material. In some examples, a conductive additive may include one or more conductive materials, such as carbon (e.g., carbon nanotubes, carbon fibers, carbon black, graphene, fullerenes), one or more metals (e.g., silver, copper, gold, aluminum, or other metal), or one or more conductive polymers. In some examples, a conductive additive may include one or more semiconductors (e.g., doped semiconductor) and/or semimetals. Conductive additives may be in the form of flakes (e.g., metal flakes such as silver or gold flakes), nanowires (e.g., metal nanowires such as silver nanowires or gold nanowires, or carbon nanotubes), or other electrically conductive (e.g., metal-based, carbon-based, semiconductor based, conductive polymer based, or other conductive material based) particle, fiber, flake, plate, disk, dendrimer, rod, tube, wire, or any combination thereof, such as nanostructures and/or microstructures.

In some examples, a membrane material may be modified (e.g., by including an additive in the membrane material) to modify at least one electrical parameter such as the dielectric constant, dielectric loss, dielectric strength, or volume resistivity.

In some examples, an electrically conductive additive may be added in the proportion of 0.1 wt. % to 50 wt. %, 0.5 wt. % to 30 wt. %, or 0.8 wt. % to 20 wt. %, or 1 wt. % to 10 wt. % within the total mass of a polymer composite and/or membrane.

In some examples, the volume resistivity of a membrane may be in the range of $10^4$ to $10^{12}$ ohm.cm, for example, in the range of $10^9$ to $10^{11}$ ohm.cm. The concentration of conductive additive may be adjusted to obtain a desired conductivity. Adding at least one electrically conductive additive to a membrane may also improve (e.g., increase) the relative dielectric constant of the membrane. In some examples, a relative dielectric constant greater than 50, and in some examples, greater than 100 may be obtained by adjusting the amount and/or type of an electrically conductive additive.

In some examples, conductive additives may also include one or more electrically conductive polymers and/or oligomers, and may include polyaniline, PEDOT:PSS (poly(3, 4-ethylenedioxythiophene) polystyrene sulfonate), a polythiophene (e.g., P3HT), any polymers with a conjugated backbone (e.g., having electron delocalization), other conducting polymer, ionomers, or any combination of these examples.

Intrinsically conductive polymers/oligomers may be added to form polymer blends, or may be pre-formed as particles or fibers that may be added to the polymer. In some examples, intrinsically conductive polymeric fibers may be prepared by an electrospinning process. In some examples, one or more intrinsically conductive polymers and/or oligomers may be added in the amount of 1 wt. % to 50 wt. %, 2 wt. % to 30 wt. %, or 5 wt. % to 20 wt. % over the total mass of the composite. The corresponding volume resistivity may be in the range of $10^8$ to $10^{12}$ ohm.cm, for example, $10^9$ to $10^{11}$ ohm.cm.

In some examples, a fluorinated copolymer may be grafted with additional conductive polymer blocks. In some examples, the tetrapolymer or higher may be phase-separated into high dielectric domain and conductive domain after annealing processes, which may include thermal annealing or solvent annealing. In some examples, the conductive polymer blocks may include conjugated backbones.

In some examples, a fluorinated polymer may be copolymerized or grafted with additional non-conductive polymer blocks, which may be phase-separated into high dielectric domains and non-conductive polymer domains. In some examples, lower conductivity polymer domains may host conductive additives. The conductive additives may be added as a higher proportion to the intrinsically lower conductivity domains and may be present in a lower proportion in the high dielectric domains. Example approaches using spatially variable doping proportions may be used to avoid degrading the dielectric properties of the high dielectric domains using the conductive additive, while lowering the overall conductivity of the polymer material.

In some examples, the toughness of a membrane material (e.g., a polymer such as PVDF-TrFE-CTFE or other membrane material) may be increased by adding a toughener to the polymer. Example tougheners may include fibers, flakes, core-shell rubber particles, or any combination of suitable additives. A toughener may be added in the amount of 1 wt. % to 30 wt. %, such as 2 wt. % to 20 wt. %, or for example, 5 wt. % to 10 wt. % to a membrane matrix material. These and any other ranges may be inclusive and/or may be approximate.

In some examples, an additive may be added to a membrane material to modify one or more mechanical properties such as Young's modulus, tensile strength, or other elastic constant (e.g., related to a membrane distortion such as stretching).

In some examples, a polymer composite (such as a fluorinated polymer or PVDF-TrFE-CTFE composite) may optionally include toughener additives. The toughener additives may include fibers, flakes, core-shell rubbers, or a combination of thereof. The toughener additives may also include polymers including fluoroelastomers, or non-fluorinated elastomers, or a combination thereof as polymer blends or plasticizer. In some examples, elastomeric blocks may be optionally covalently bonded or grafted to the polymer (e.g., to fluorinated polymer or PVDF-TrFE-CTFE).

In some examples, an additive may be included within a membrane material to modify processibility, such as rheological behavior, for example, viscosity during processing. In some examples, a membrane material may include a polymerizable and/or cross-linkable material, and an example membrane may be polymerized (e.g., further polymerized) and/or cross-linked (e.g., further cross-linked), for example, after one or more processing steps and optionally before use in an apparatus.

In some examples, a membrane material may include a dielectric material that may include a plurality of additive forms, such as particles, fibers, flakes, or other additive forms. In some examples, additive forms may include polymer fibers or other polymer additive forms. Polymers may include one or more of the following: a polyamide, polyester, polyethylene, polystyrene, polyvinyl chloride, polyurethane, phenol-formaldehyde, elastolefin, or any combination of suitable polymers. Example additive forms may include polymer fibers and/or other dielectric fibers. In some examples, fibers may include a carbon-based, ceramic based, glass-based, or metal-based material, or any other suitable inorganic material, or any derivative and/or combination thereof.

In some examples, a membrane may include flakes, which in this context may include plates, disks, irregular flakes, and/or other generally flattened and/or planar additives. In some examples, flakes may include one or more polymers such as a polyamide, polyester, polyethylene, polystyrene, polyvinyl chloride, polyurethane, phenol-formaldehyde, elastolefin, or any combination of polymers. In some examples, flakes may include mineral flakes (e.g., laminar mineral flakes such as mica flakes), and/or inorganic materials such as metals, metal compounds, glass, or ceramic flakes. In some examples, flakes may include a carbon based, ceramic based, or metal based material.

In some examples, a membrane may include particles, such as core-shell particles. Example core-shell particles may include core-shell rubber particles that may include a core and a shell. The shell may fully or partially enclose the core. The core of an example core-shell rubber particle may include one or more polymers, such as polymers formed from monomers selected from the group of methylmethacrylate-butadiene-styrene monomers, methacrylate-acrylonitrile-butadiene-styrene monomers, other synthetic rubbers, or a combination of suitable materials. Example core polymers may include elastomers, such as elastomeric acrylate-based polymers. The shell of an example core-shell rubber particle may include one or more of an acrylic polymer, an acrylic copolymer, or one or more (e.g., a polymer blend) of any suitable polymers.

In some examples, an example core-shell rubber particle may have a styrene butadiene rubber core and a shell including an acrylic polymer and/or an acrylic copolymer. The core may include one or more compounds such as acrylonitrile-butadiene-styrene, acrylate-styrene-acrylonitrile, acrylics, styrene-acrylonitrile grafted onto elastomeric backbones of ethylene-propylene diene monomer, methacrylic-acrylic rubber styrene, and their derivatives, analogs, or combinations.

Particles, such as core-shell rubber particles, may have a diameter (or equivalent particle size) that may be greater than 50 nm. In some examples, core-shell rubber particles may have a particle size (e.g., diameter) in the range of from 20 microns to 200 microns, for example, between 70 microns to 150 microns. In some examples, a toughener may include one or more polymers, such as a fluoro-elastomer, included in a polymer blends or as plasticizer or other form.

In some examples, a toughener may include an elastomer, such as a fluoroelastomer. In some examples, a fluoroelastomer may include at least one of VDF (vinylidene fluoride), TrFE (trifluoroethylene) and/or chlorotrifluoroethylene (CTFE). In some examples, a fluoroelastomer may include (e.g., be prepared using) one or more fluorinated monomer or non-fluorinated monomer species. In some examples, fluorinated monomers may include fluorinated C2-C10 olefins (that, in some examples, may not include hydrogen and/or chlorine atoms), such as 2-chloropentafluoropropene, dichlorodifluoroethylene, vinyl fluoride, fluorinated alkyl vinyl monomers such as hexafluoropropylene (HFP), fluorinated vinyl ethers, including perfluorinated vinyl ethers and fluorinated allyl ethers including perfluorinated allyl ethers (collectively referred to as PAE). In some examples, an example fluorinated monomer may include a fluorinated silicone. Suitable non-fluorinated co-monomers may include vinyl chloride, vinylidene chloride, butadiene, isoprene, and C2-C10 olefins. In some examples, the toughener may include non-fluorinated polymers.

In some examples, a polymer (such as PVDF-TrFE-CTFE) may be copolymerized or grafted with additional elastomeric polymer blocks, which may be phase-separated into a high dielectric domain and an elastomeric domain. The elastomeric polymer blocks may include silicone, urethane, acrylate, acrylamide, vinyl chloride, vinylidene chloride, butadiene, isoprene, fluorinated monomers and C2-C10 olefins.

In some examples, the film thickness may be within the range of 100 nm to 1 mm, or 500 nm to 500 microns, or 1 micron to 100 microns. The volume resistivity of the static dissipative dielectric membrane may be in the range $10^8$ ohm.cm to $10^{12}$ ohm.cm, for example, $10^9$ ohm.cm to $10^{11}$ ohm.cm.

In some examples, the tensile strength of a membrane may be at least approximately 0.5 MPa, for example, at least approximately 1 MPa and in some examples at least approximately 5 MPa. In some examples, the elongation at break may be at least approximately 5%, for example, at least approximately 10%, for example, at least approximately 20%.

In some examples, a polymer (such as a functionalized PVDF-TrFE-CTFE film) may have a dielectric constant of at least approximately 10, for example, at least approximately 20, for example, a dielectric constant of at least approximately 30. In this context, the dielectric constant may be a relative dielectric constant.

In some examples, electrical breakdown strength of an example polymer, polymer-based membrane, or other dielectric membrane may be at least approximately 100V/micron, for example, at least approximately 200V/micron, for example, at least approximately 500V/micron.

In some examples, the membrane thickness of a membrane (e.g., a polymer membrane or other membrane) may be within the range of 100 nm to 1 mm, or 2 micron to 3 mm, or 3 micron to 1 mm. In some examples, the volume resistivity of the polymer film may be within the range $10^8$ ohm.cm to $10^{12}$ ohm.cm, for example, $10^9$ to $10^{11}$ ohm.cm.

One or more physical parameters (such as electrical, mechanical, or rheological parameters) may be adjusted for a polymer (such as PVDF-TrFE-CTFE or other fluorinated polymer) using one or more of the approaches described herein. Parameters that may be adjusted may include one or more mechanical properties (e.g., Young's modulus, tensile strength, processibility (such as rheological behaviors), or viscosity) and/or one or more electrical properties (such as dielectric constant, dielectric loss, dielectric strength, dielectric relaxation frequency, or volume resistivity).

Examples include membrane materials (e.g., dielectric layers) with modified electrical and/or mechanical properties. A polymer membrane may have a volume resistivity in the range of $10^8$ to $10^{12}$ ohm.cm. The membrane conductivity may facilitate formation of zipped states (electrostatically bound states) in actuators and may help dissipate charges in the electrical double layer of a zipped state. In some examples, a polymer composite may include a base polymer (e.g., PVDF-TrFE-CTFE) and one or more conductive additives, such as conductive fillers, which may include carbon nanotubes, carbon fibers, graphene, metal flakes, metal particles, metal nanowires, or any combination of additives. Metals may include gold, silver, copper, aluminum, or any other suitable metal or alloy. Conductive additives may also include conductive polymers (e.g., polyaniline, PEDOT:PSS, or P3HT) as polymer blends, particles, or fibers. Conductive additives may be present as 0.1-50% by weight. In some examples, the base polymer may be chemically modified, for example, by bonding or otherwise introducing electrically conducting blocks into the polymer chain. An example polymer blend may alternatively (or additionally) include a mechanical modifier (e.g., a modifier that may add toughness and/or flexibility). Example mechanical modifiers include fluoropolymer elastomers, plasticizers, elastic fibers, inelastic fibers (which may strengthen the composite), or other modifiers. The base polymer may be chemically modified using fluoropolymer elastomeric blocks. An example base polymer may be PVDF-TrFE-CTFE, which has excellent dielectric properties (such as a high dielectric constant and high dielectric strength), but may be too soft and easy to tear (e.g., for processing into a membrane or use as an actuator membrane). One or more of the suggested modifications, in any combination, may be used to increase the tensile strength and/or adjust the conductivity of a polymer such as PVDF-TrFE-CTFE. Other polymers that may be modified using one or more of the described approaches include polyolefins and their derivatives, including biaxially-oriented polyolefins (such as biaxially-oriented polypropylene, BOPP) and thermoplastic elastomers (such as a polyester/polyether, co-polyester, or polyimide/siloxane block copolymers). Applications, discussed further below, include improved membrane-based actuators (e.g., using membranes, electrodes and a dielectric fluid, such as a dielectric liquid, such as an ester oil or methoxy-substituted fluoropentane), sensors, liquid lenses, dielectric films, ferroelectric materials, electroactive materials (e.g., in electroactive actuators), electrocaloric materials, pyroelectric materials or other applications. In some examples, the dielectric liquid may have no appreciable electrical conductivity.

Example apparatus may include transducers (e.g., actuators such as haptic devices and/or sensors), fluid lenses (e.g., adjustable liquid lenses), adjustable lenses for optical systems (e.g., laser, projection, display, or other systems), dielectric films having improved static dissipation properties, ferroelectric devices, electroactive devices (e.g., electroactive actuators), electrocaloric devices, pyroelectric devices, ferroelectric devices, piezoelectric devices, flexoelectric devices, electro-adhesion devices or other devices or applications. In some examples, a device may include at least one improved membrane, for example, a membrane including as a dielectric material such as an inorganic dielectric membrane, a polymer membrane (e.g., a polymer composite membrane) and/or other suitable membrane.

Example polymer films (such as a PVDF-TrFE-CTFE based film) may be used as a dielectric membrane within an actuator (such as an electrostatic zipping actuator or dielectric elastomer actuator), a sensor (such as a printed sensor), a stretchable electronic device, an electro-adhesion device, or other electrostatic device.

In some examples, a polymer film (e.g., including PVDF-TrFE-CTFE) may be a component (such as a membrane or dielectric layer) of a device, such as an electrostatic device. Example devices may include an electrostatic zipping actuator, elastomer actuator (e.g., a dielectric elastomer actuator), printed sensor, stretchable electronic device, electro-adhesion device, or other device such as any electrostatic or electrically adjustable device.

In some examples, an electrostatic actuator (such as an electrostatic zipping actuator) may be used in a non-pneumatic haptics device, for example, in a wearable apparatus such as a glove or wrist band. An example electrostatic actuator may be used as a tactile, kinesthetic, or shear actuator. Electrostatic actuators (such as electrostatic zipping actuators) may have reduced transmission loss, potentially lower latency, using a battery as the energy source and more mature control technologies compared with, for example, a pneumatics-based haptic device. However, an electrostatic actuator may require a high voltage and more insulation. To maximize the performance of example electrostatic zipping actuators, a new dielectric membrane with high dielectric constant (e.g., a relative dielectric constant greater than 10, 20, or 30) and high breakdown strength would be useful to reduce the required voltage of the actuator, while providing high output force and swift response. Improving the dielectric constant of a dielectric membrane may also relax the requirement on the thickness of the dielectric membrane, which may greatly reduce product rejections during the manufacture of dielectric membranes.

Improved membranes (e.g., dielectric elastomers) with one or more of a high dielectric constant (e.g., a relative dielectric constant greater than 10, such as greater than 20), high dielectric strength, improved toughness and an electrical conductivity within a particular range may be useful for electrostatic zipping actuators or other electrostatic device applications. Examples may also include a dielectric elastomer actuator (DEA) with stronger force and higher displacement output that may serve as a soft vibrotactile (VT) device. Example apparatus may include arrangements (e.g., arrays) of actuators that may convey haptic signals over an area of a body. In some examples, a wearable apparatus may conform to a body part (e.g., a hand) of a user and provide sensations that may relate to a virtual reality or augmented reality environment shown to the user through a display device, providing an improved immersive experience.

In some examples, a polymer film may be used as dielectric membrane for electrostatic zipping actuator, dielectric elastomer actuator, printed sensors, stretchable electronics, electro-adhesion, etc.

In some examples, an actuator may include a pair of opposed electrodes separated by a dielectric fluid. The electrodes may be supported by at least one deformable membrane. A capacitance sensor may be integrated with an electrostatic or piezoelectric haptic actuator to provide real-time feedback and dynamic control of the device. In a zipping tactile actuator, for example, a measurable capacitance may be approximately proportional to the overlapping (zipped) area between the electrodes, which may be related to both a displacement output of the device and/or a force applied to the deformable membrane(s) by a user.

In some examples, the required voltage used to drive a haptic actuator may be decreased by replacing at least a portion of a conventional insulating membrane (e.g., a deformable membrane) with a weakly conductive membrane, for example, having a bulk or volume resistivity ($\rho_{bulk}$) of between approximately $10^8$ ohm.cm and $10^{12}$ ohm.cm, such as between approximately $10^9$ ohm.cm and $10^{11}$ ohm.cm. The volume resistivity may be determined for at least one operational temperature (e.g., between 20° C. and 35° C., such as at 20° C. or 25° C.), for example, at a suitable operational frequency, which may vary with specific application but which may be 100 Hz, 1 kHz, 10 kHz, or other suitable frequency. In some examples, the drive frequency may be varied to provide a haptic signal to a user.

In some examples, a weakly conductive membrane or portion thereof may be located between the inner surface of an electrode and the dielectric fluid. In some examples, a weakly conducting layer may be formed on an electrode, for example, as part of a membrane assembly including a membrane, an electrode, and a weakly conducting layer that may be part of the membrane or a separate membrane. In some examples, an electrode may be located between an insulating layer and a weakly conductive layer, where the weakly conductive layer may be located between the electrode and a dielectric fluid located within an enclosure within a transducer, such as an actuator. In some examples, the weakly conductive layer may have a volume resistivity that may be 4-10 orders of magnitude lower than that of the insulating layer, or other suitable value. In some examples, the weakly conductive layer may have a volume resistivity that may be at least 10 orders of magnitude greater than that of the electrode material, or other suitable value. In some examples, resistivity measurements and resistivity comparisons may be made at the same temperature (e.g., 20 degrees C.) and any suitable frequency.

In some examples, an apparatus may include a first layer (e.g., a first membrane), a first electrode supported by the first layer, a second layer, a second electrode supported by the second layer and a dielectric fluid located within an enclosure at least partially defined by the first layer and the second layer, where the first layer is a membrane including a membrane material. The first electrode may be located on an outer surface of the membrane and the dielectric fluid may be in contact with at least a portion of an inner surface of the membrane. Example membrane materials include a polymer (e.g., a fluorinated polymer) or an inorganic dielectric material such as a metal oxide (e.g., aluminum oxide or titanium oxide). In some examples, the membrane includes PVDF-TrFE-CTFE, or a derivative or blend thereof. In some examples, the membrane may further include an electrically conductive additive, such as an electrically conductive particle or an electrically conductive fiber. An electrically conductive additive may include a metal, an electrically conductive polymer, or other electrically conductive material. The electrically conductive additive may be included in a proportion selected so that the membrane material has an electrical resistivity in the range $10^8$-$10^{12}$ ohm.cm, such as in the range $10^9$-$10^{11}$ ohm.cm.

In some examples, an apparatus may be configured so that an electrical potential between the first and second electrodes induces a movement of the first electrode towards the second electrode. The electrical potential may be alternating or direct. An apparatus may include a controller configured to control an electrical potential applied between the first electrode and the second electrode. The electrical potential may be selectable to obtain a particular degree of actuation of the device. In some examples, the electric potential may be selectable to obtain a zipped state, for example, where portions of the first and second membranes located between the electrodes are substantially adjacent when the device is in the zipped state. The dielectric fluid may be substantially excluded from between the first and second electrodes when the device is in the zipped state.

In some examples, the apparatus may be or include an actuator, such as a haptic device. Movement of the first electrode towards the second electrode may induce a flow of dielectric fluid from between the first electrode and the second electrode into another portion of the device, such as a central portion of the device. The flow of dielectric fluid may induce stretching of the membrane within the other portion of the device, such as the central portion of the device. In some examples, an apparatus may be or include a wearable apparatus and the apparatus may be configured to provide a haptic signal to a user.

In some examples, the apparatus may be or include a sensor. The apparatus may include a sensor controller configured to determine a capacitance between the first electrode and the second electrode. The capacitance may be used to determine a degree of actuation of the device.

In some examples, an apparatus may be or include a haptic device configured to be worn by a user. The apparatus may be configured to provide a perceptible tactile sensation to the user in response to the electrical potential applied between a pair of electrodes when the device is worn by the user. In some examples, the apparatus may include a wristband or a glove.

In some examples, the membrane may include a portion located between the first electrode and the inner surface of the membrane. At least the portion of the membrane may be weakly electrically conductive and may have a resistivity (e.g., a volume resistivity) of between $10^8$ ohm.cm and $10^{12}$ ohm.cm.

In some examples, the membrane resistivity may be configured to allow an electric double layer to dissipate through diffusion of electrical charges (e.g., electrons and/or ions) through the membrane based on the electrical conductivity of the membrane. The electrical conductivity of the membrane and/or the signal frequency may be selected so the electrical double layer may dissipate with a time period (e.g., a characteristic time period) less than the time period of an electrostatic signal of a particular polarity applied between the electrodes. The time period of the electrostatic signal may be approximately half of the reciprocal of the signal frequency of the signal applied to the electrodes.

An example membrane may include a toughener, for example, at least one of polymer fibers, other fibers (e.g., inorganic dielectric fibers), flakes, particles (e.g., core-shell particles such as core-shell rubber particles). In some examples, the membrane and/or the toughener may include an elastomer.

In some examples, a membrane assembly may include a first layer and at least one additional layer, such as a second layer. In some examples, the second layer may include a second membrane or other substrate such as a dielectric substrate, a polymer, or other material.

In some examples, an apparatus may include a first membrane including a membrane material, a first electrode supported by the first membrane, a second membrane, a second electrode supported by the second membrane, and a dielectric fluid located within an enclosure at least partially defined by the first membrane and the second membrane. The membrane material may include a dielectric material and/or a polymer. Example membranes may include a fluoropolymer such as PVDF-TrFE-CTFE or a derivative or blend thereof. The membrane material may further include an electrically conductive additive and/or a toughener. An example apparatus may include an electrically controllable actuator, such as a haptic device, and may in some examples be a sensor. In some examples, an apparatus may be an electrostatically controlled apparatus such as an actuator. In some examples, an apparatus may be or include an actuator, a sensor, an electrocaloric device, a piezoelectric device, or a pyroelectric device. In some examples, an apparatus may include an arrangement (e.g., an array) of actuators, where each actuator may include a membrane or portion thereof supporting at least one electrode.

In addition to haptic actuators, the described membranes may be used in a wide range of device applications, including optical devices such as liquid lenses, for example, including a polymer thin film as an adjustable transparent polymer membrane. In some examples, a liquid lens may have an electrode architecture that may include one or both of parallel plate and/or co-planar electrode configurations. In some examples, a first electrode may be located on a first membrane and a second electrode may be located on a second membrane or a substrate and disposed approximately parallel to the first electrode. In some examples, first and second electrodes may be disposed on the same membrane. In some examples, an electric signal may be used to adjust the optical properties of an adjustable lens, for example, the focal length. Applications may include optical apparatus such as telescopes, binoculars, zoom lenses for cameras, and the like.

In some examples, an apparatus may include a membrane, a first electrode supported by the membrane, a second electrode, a dielectric fluid located within a fluid enclosure at least partially defined by the membrane, and a controller configured to apply an electrical potential between the first electrode and the second electrode. The membrane may include a dielectric material and an electrically conductive additive. In some examples, the electrically conductive additive may include at least one of a metal, an electrically conductive metal oxide, carbon, or an electrically conductive polymer. An electrically conducting additive may be in the form of at least one of fibers, flakes, rods, or particles. A membrane may have a volume resistivity of between $10^6$ ohm.cm and $10^{12}$ ohm.cm, such as between $10^8$ ohm.cm and $10^{12}$ ohm.cm, and in some examples between $10^9$ ohm.cm and $10^{11}$ ohm.cm.

EXAMPLE EMBODIMENTS

Example 1. An apparatus may include a membrane, a first electrode supported by the membrane, a second electrode, a dielectric fluid located within a fluid enclosure at least partially defined by the membrane, and a controller configured to apply an electrical potential between the first electrode and the second electrode, where the membrane comprises a dielectric material and an electrically conductive additive.

Example 2. The apparatus of example 1, where the electrically conductive additive comprises at least one of a metal, an electrically conductive metal oxide, carbon, or an electrically conductive polymer.

Example 3. The apparatus of any of examples 1-2, where the electrically conductive additive comprises at least one of fibers, rods, or particles.

Example 4. The apparatus of any of examples 1-3, where the membrane has a volume resistivity of between $10^8$ ohm.cm and $10^{12}$ ohm.cm.

Example 5. The apparatus of any of examples 1-4, where the membrane has a volume resistivity of between $10^9$ ohm.cm and $10^{11}$ ohm.cm.

Example 6. The apparatus of any of examples 1-5, where the dielectric material comprises a glass or ceramic.

Example 7. The apparatus of any of examples 1-6, where the membrane comprises a fluoropolymer.

Example 8. The apparatus of any of examples 1-7, where the membrane comprises a copolymer of vinylidene difluoride.

Example 9. The apparatus of any of examples 1-8, where the membrane comprises poly(vinylidene difluoride-trifluoroethylene-chlorotrifluoroethylene).

Example 10. The apparatus of any of examples 1-9, where the membrane further comprises a toughener.

Example 11. The apparatus of example 10, where the toughener comprises polymer fibers or particles.

Example 12. The apparatus of any of examples 1-11, where the second electrode is supported by a second membrane and the second membrane has a volume resistivity of between $10^8$ ohm.cm and $10^{12}$ ohm.cm.

Example 13. The apparatus of any of examples 1-12, where the electrical potential reduces a separation between the first electrode and the second electrode and induces a flow of the dielectric fluid from between the first electrode and the second electrode.

Example 14. The apparatus of any of examples 1-13, where the apparatus is a wearable apparatus configured to be worn by a user.

Example 15. The apparatus of any of examples 1-14, where a flow of the dielectric fluid in response to the electric potential induces a haptic signal to the user when the apparatus is worn by the user.

Example 16. The apparatus of any of examples 1-15, where the apparatus comprises a wristband or a glove.

Example 17. The apparatus of any of examples 1-16, where the apparatus is an augmented reality apparatus or a virtual reality apparatus.

Example 18. A method comprising fabricating a membrane comprising a dielectric material and an electrically conductive additive, depositing an electrode on the membrane, and assembling a transducer comprising the membrane, the electrode, a dielectric fluid, and a second electrode, where at least a portion of the membrane is located between the electrode and the dielectric fluid.

Example 19. The method of any of examples 18, where the second electrode is supported by a second membrane, and at least a portion of the second membrane is located between the second electrode and the dielectric fluid.

Example 20. A method, comprising applying an electrical signal between a first electrode and a second electrode within a transducer, electrostatically adhering a first membrane adjacent the first electrode to a second membrane adjacent the second electrode using the electrical signal, and expelling dielectric fluid from between the first electrode and the second electrode to provide actuation of the transducer, where the first membrane comprises a dielectric material and an electrically conductive additive.

Embodiments of the present disclosure may include or be implemented in conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 1900 in FIG. 19) or that visually immerses a user in an artificial reality (such as, e.g., virtual-reality system 2000 in FIG. 20). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 19:
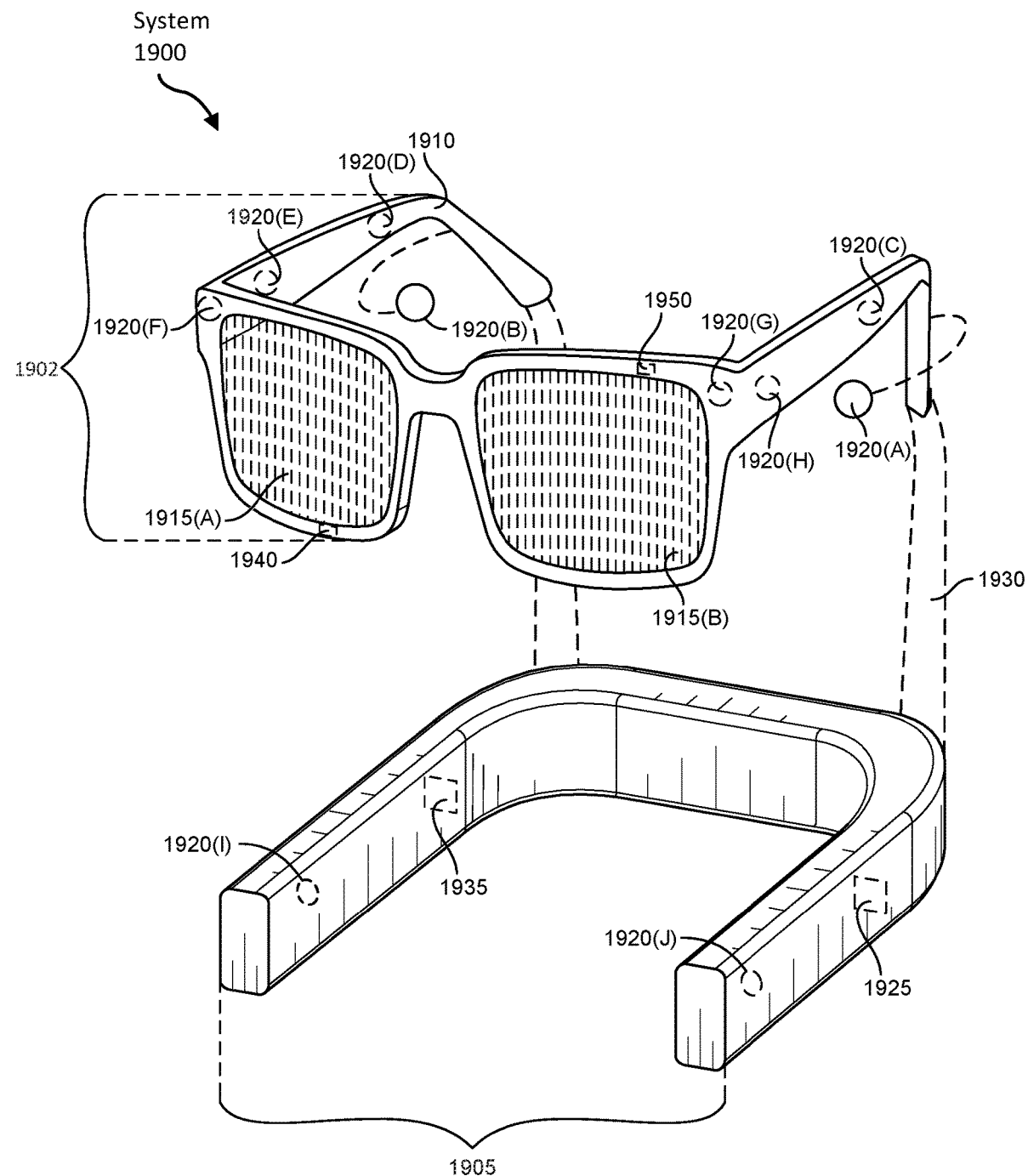
FIG. 19 is an illustration of exemplary augmented-reality glasses that may be used in connection with embodiments of this disclosure.

Turning to FIG. 19, augmented-reality system 1900 may include an eyewear device 1902 with a frame 1910 configured to hold a left display device 1915(A) and a right display device 1915(B) in front of a user's eyes. Display devices 1915(A) and 1915(B) may act together or independently to present an image or series of images to a user. While augmented-reality system 1900 includes two displays, embodiments of this disclosure may be implemented in augmented-reality systems with a single NED or more than two NEDs.

In some embodiments, augmented-reality system 1900 may include one or more sensors, such as sensor 1940. Sensor 1940 may generate measurement signals in response to motion of augmented-reality system 1900 and may be located on substantially any portion of frame 1910. Sensor 1940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1900 may or may not include sensor 1940 or may include more than one sensor. In embodiments in which sensor 1940 includes an IMU, the IMU may generate calibration data based on measurement signals from sensor 1940. Examples of sensor 1940 may include, without limitation, accelerometers, gyroscopes, magnetometers, other suitable types of sensors that detect motion, sensors used for error correction of the IMU, or some combination thereof.

In some examples, augmented-reality system 1900 may also include a microphone array with a plurality of acoustic transducers 1920(A)-1920(J), referred to collectively as acoustic transducers 1920. Acoustic transducers 1920 may represent transducers that detect air pressure variations induced by sound waves. Each acoustic transducer 1920 may be configured to detect sound and convert the detected sound into an electronic format (e.g., an analog or digital format). The microphone array in FIG. 19 may include, for example, ten acoustic transducers: 1920(A) and 1920(B), which may be designed to be placed inside a corresponding ear of the user, acoustic transducers 1920(C), 1920(D), 1920(E), 1920(F), 1920(G), and 1920(H), which may be positioned at various locations on frame 1910, and/or acoustic transducers 1920(1) and 1920(J), which may be positioned on a corresponding neckband 1905.

In some embodiments, one or more of acoustic transducers 1920(A)-(J) may be used as output transducers (e.g., speakers). For example, acoustic transducers 1920(A) and/or 1920(B) may be earbuds or any other suitable type of headphone or speaker.

The configuration of acoustic transducers 1920 of the microphone array may vary. While augmented-reality system 1900 is shown in FIG. 19 as having ten acoustic transducers 1920, the number of acoustic transducers 1920 may be greater or less than ten. In some embodiments, using higher numbers of acoustic transducers 1920 may increase the amount of audio information collected and/or the sensitivity and accuracy of the audio information. In contrast, using a lower number of acoustic transducers 1920 may decrease the computing power required by an associated controller 1950 to process the collected audio information. In addition, the position of each acoustic transducer 1920 of the microphone array may vary. For example, the position of an acoustic transducer 1920 may include a defined position on the user, a defined coordinate on frame 1910, an orientation associated with each acoustic transducer 1920, or some combination thereof.

Acoustic transducers 1920(A) and 1920(B) may be positioned on different parts of the user's ear, such as behind the pinna, behind the tragus, and/or within the auricle or fossa. Or, there may be additional acoustic transducers 1920 on or surrounding the ear in addition to acoustic transducers 1920 inside the ear canal. Having an acoustic transducer 1920 positioned next to an ear canal of a user may enable the microphone array to collect information on how sounds arrive at the ear canal. By positioning at least two of acoustic transducers 1920 on either side of a user's head (e.g., as binaural microphones), augmented-reality system 1900 may simulate binaural hearing and capture a 3D stereo sound field around about a user's head. In some embodiments, acoustic transducers 1920(A) and 1920(B) may be connected to augmented-reality system 1900 via a wired connection 1930, and in other embodiments acoustic transducers 1920(A) and 1920(B) may be connected to augmented-reality system 1900 via a wireless connection (e.g., a BLUETOOTH connection). In still other embodiments, acoustic transducers 1920(A) and 1920(B) may not be used at all in conjunction with augmented-reality system 1900.

Acoustic transducers 1920 on frame 1910 may be positioned in a variety of different ways, including along the length of the temples, across the bridge, above or below display devices 1915(A) and 1915(B), or some combination thereof. Acoustic transducers 1920 may also be oriented such that the microphone array is able to detect sounds in a wide range of directions surrounding the user wearing the augmented-reality system 1900. In some embodiments, an optimization process may be performed during manufacturing of augmented-reality system 1900 to determine relative positioning of each acoustic transducer 1920 in the microphone array.

In some examples, augmented-reality system 1900 may include or be connected to an external device (e.g., a paired device), such as neckband 1905. Neckband 1905 generally represents any type or form of paired device. Thus, the following discussion of neckband 1905 may also apply to various other paired devices, such as charging cases, smart watches, smart phones, wrist bands, other wearable devices, hand-held controllers, tablet computers, laptop computers, other external compute devices, etc.

As shown, neckband 1905 may be coupled to eyewear device 1902 via one or more connectors. The connectors may be wired or wireless and may include electrical and/or non-electrical (e.g., structural) components. In some cases, eyewear device 1902 and neckband 1905 may operate independently without any wired or wireless connection between them. While FIG. 19 illustrates the components of eyewear device 1902 and neckband 1905 in example locations on eyewear device 1902 and neckband 1905, the components may be located elsewhere and/or distributed differently on eyewear device 1902 and/or neckband 1905. In some embodiments, the components of eyewear device 1902 and neckband 1905 may be located on one or more additional peripheral devices paired with eyewear device 1902, neckband 1905, or some combination thereof.

Pairing external devices, such as neckband 1905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1900 may be provided by a paired device or shared between a paired device and an eyewear device, thus reducing the weight, heat profile, and form factor of the eyewear device overall while still retaining desired functionality. For example, neckband 1905 may allow components that would otherwise be included on an eyewear device to be included in neckband 1905 since users may tolerate a heavier weight load on their shoulders than they would tolerate on their heads. Neckband 1905 may also have a larger surface area over which to diffuse and disperse heat to the ambient environment. Thus, neckband 1905 may allow for greater battery and computation capacity than might otherwise have been possible on a stand-alone eyewear device. Since weight carried in neckband 1905 may be less invasive to a user than weight carried in eyewear device 1902, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1905 may be communicatively coupled with eyewear device 1902 and/or to other devices. These other devices may provide certain functions (e.g., tracking, localizing, depth mapping, processing, storage, etc.) to augmented-reality system 1900. In the embodiment of FIG. 19, neckband 1905 may include two acoustic transducers (e.g., 1920(1) and 1920(J)) that are part of the microphone array (or potentially form their own microphone subarray). Neckband 1905 may also include a controller 1925 and a power source 1935.

Acoustic transducers 1920(1) and 1920(J) of neckband 1905 may be configured to detect sound and convert the detected sound into an electronic format (analog or digital). In the embodiment of FIG. 19, acoustic transducers 1920(1) and 1920(J) may be positioned on neckband 1905, thereby increasing the distance between the neckband acoustic transducers 1920(1) and 1920(J) and other acoustic transducers 1920 positioned on eyewear device 1902. In some cases, increasing the distance between acoustic transducers 1920 of the microphone array may improve the accuracy of beamforming performed via the microphone array. For example, if a sound is detected by acoustic transducers 1920(C) and 1920(D) and the distance between acoustic transducers 1920(C) and 1920(D) is greater than, for example, the distance between acoustic transducers 1920(D) and 1920(E), the determined source location of the detected sound may be more accurate than if the sound had been detected by acoustic transducers 1920(D) and 1920(E).

Controller 1925 of neckband 1905 may process information generated by the sensors on neckband 1905 and/or augmented-reality system 1900. For example, controller 1925 may process information from the microphone array that describes sounds detected by the microphone array. For each detected sound, controller 1925 may perform a direction-of-arrival (DOA) estimation to estimate a direction from which the detected sound arrived at the microphone array. As the microphone array detects sounds, controller 1925 may populate an audio data set with the information. In embodiments in which augmented-reality system 1900 includes an inertial measurement unit, controller 1925 may compute all inertial and spatial calculations from the IMU (inertial measurement unit) located on eyewear device 1902. A connector may convey information between augmented-reality system 1900 and neckband 1905 and between augmented-reality system 1900 and controller 1925. The information may be in the form of optical data, electrical data, wireless data, or any other transmittable data form. Moving the processing of information generated by augmented-reality system 1900 to neckband 1905 may reduce weight and heat in eyewear device 1902, making it more comfortable to the user.

Power source 1935 in neckband 1905 may provide power to eyewear device 1902 and/or to neckband 1905. Power source 1935 may include, without limitation, lithium ion batteries, lithium-polymer batteries, primary lithium batteries, alkaline batteries, or any other form of power storage. In some cases, power source 1935 may be a wired power source. Including power source 1935 on neckband 1905 instead of on eyewear device 1902 may help better distribute the weight and heat generated by power source 1935.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 2000 in FIG. 20, that mostly or completely covers a user's field of view. Virtual-reality system 2000 may include a front rigid body 2002 and a band 2004 shaped to fit around a user's head. Virtual-reality system 2000 may also include output audio transducers 2006(A) and 2006(B). Furthermore, while not shown in FIG. 20, front rigid body 2002 may include one or more electronic elements, including one or more electronic displays, one or more inertial measurement units (IMUS), one or more tracking emitters or detectors, and/or any other suitable device or system for creating an artificial-reality experience.

Artificial reality systems may include a variety of types of visual feedback mechanisms. For example, display devices in augmented-reality system 1900 and/or virtual-reality system 2000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 1900 and/or virtual-reality system 2000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 1900 and/or virtual-reality system 2000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

As noted, artificial reality system 1900 and virtual reality system 2000 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 21:
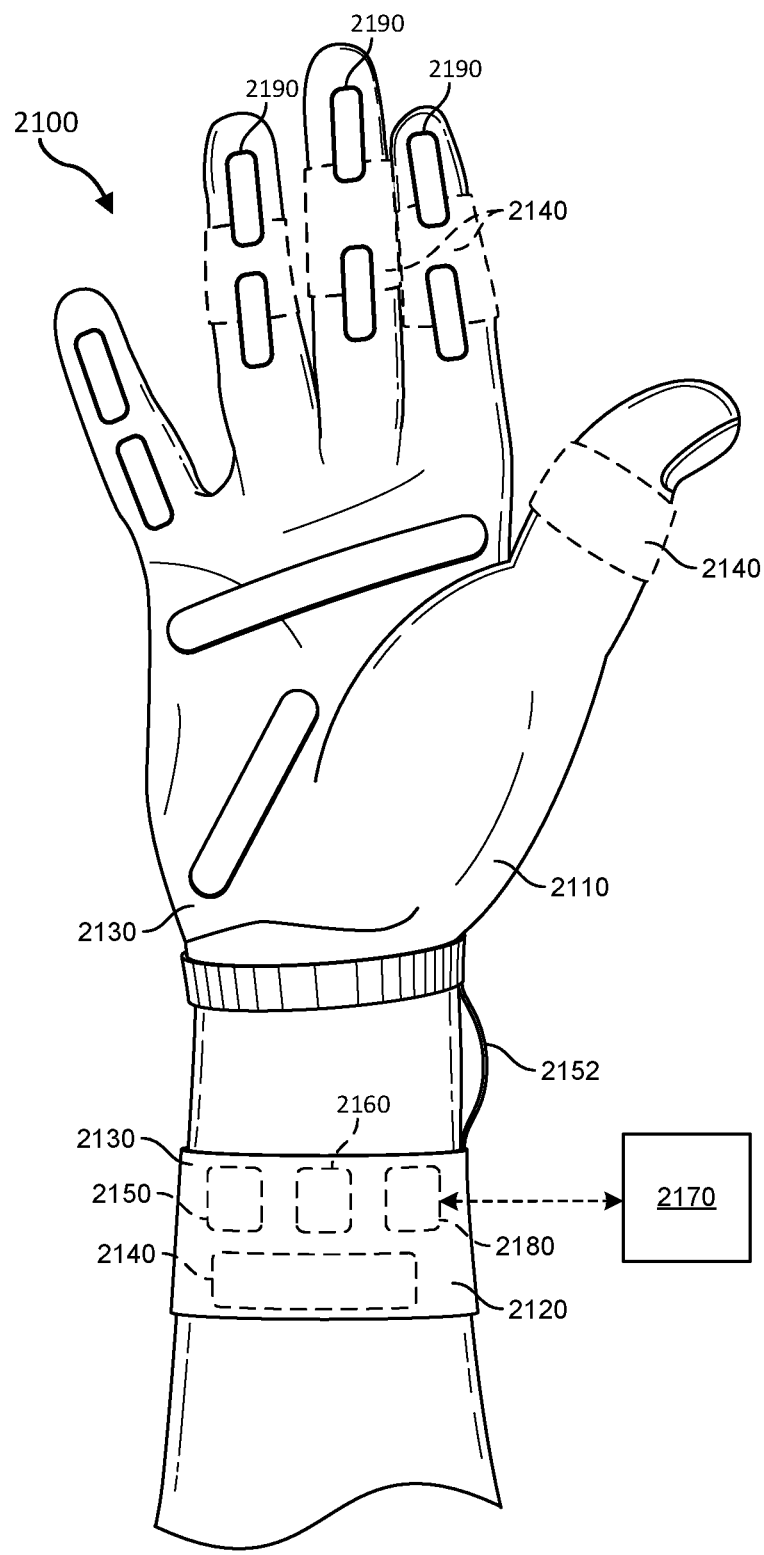
FIG. 21 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 21 illustrates a vibrotactile system 2100 in the form of a wearable glove (haptic device 2110) and wristband (haptic device 2120). Haptic device 2110 and haptic device 2120 are shown as examples of wearable devices that include a flexible, wearable textile material 2130 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 2140 may be positioned at least partially within one or more corresponding pockets formed in textile material 2130 of vibrotactile system 2100. Vibrotactile devices 2140 may be positioned in locations to provide a vibrating sensation (e.g., haptic feedback) to a user of vibrotactile system 2100. For example, vibrotactile devices 2140 may be positioned against the user's finger(s), thumb, or wrist, as shown in FIG. 21. Vibrotactile devices 2140 may, in some examples, be sufficiently flexible to conform to or bend with the user's corresponding body part(s).

A power source 2150 (e.g., a battery) for applying a voltage to the vibrotactile devices 2140 for activation thereof may be electrically coupled to vibrotactile devices 2140, such as via conductive wiring 2152. In some examples, each of vibrotactile devices 2140 may be independently electrically coupled to power source 2150 for individual activation. In some embodiments, a processor 2160 may be operatively coupled to power source 2150 and configured (e.g., programmed) to control activation of vibrotactile devices 2140.

Vibrotactile system 2100 may be implemented in a variety of ways. In some examples, vibrotactile system 2100 may be a standalone system with integral subsystems and components for operation independent of other devices and systems. As another example, vibrotactile system 2100 may be configured for interaction with another device or system 2170. For example, vibrotactile system 2100 may, in some examples, include a communications interface 2180 for receiving and/or sending signals to the other device or system 2170. The other device or system 2170 may be a mobile device, a gaming console, an artificial reality (e.g., virtual reality, augmented reality or mixed reality) apparatus (sometimes abbreviated to AR/VR apparatus or device), a personal computer, a tablet computer, a network device (e.g., a modem, a router, etc.), a handheld controller, etc. Communications interface 2180 may enable communications between vibrotactile system 2100 and the other device or system 2170 via a wireless (e.g., Wi-Fi, BLUETOOTH, cellular, radio, etc.) link or a wired link. If present, communications interface 2180 may be in communication with processor 2160, such as to provide a signal to processor 2160 to activate or deactivate one or more of the vibrotactile devices 2140.

Vibrotactile system 2100 may optionally include other subsystems and components, such as touch-sensitive pads 2190, pressure sensors, motion sensors, position sensors, lighting elements, and/or user interface elements (e.g., an on/off button, a vibration control element, etc.). During use, vibrotactile devices 2140 may be configured to be activated for a variety of different reasons, such as in response to the user's interaction with user interface elements, a signal from the motion or position sensors, a signal from the touch-sensitive pads 2190, a signal from the pressure sensors, a signal from the other device or system 2170, etc.

Although power source 2150, processor 2160, and communications interface 2180 are illustrated in FIG. 21 as being positioned in haptic device 2120, the present disclosure is not so limited. For example, one or more of power source 2150, processor 2160, or communications interface 2180 may be positioned within haptic device 2110 or within another wearable textile.

Figure 22:
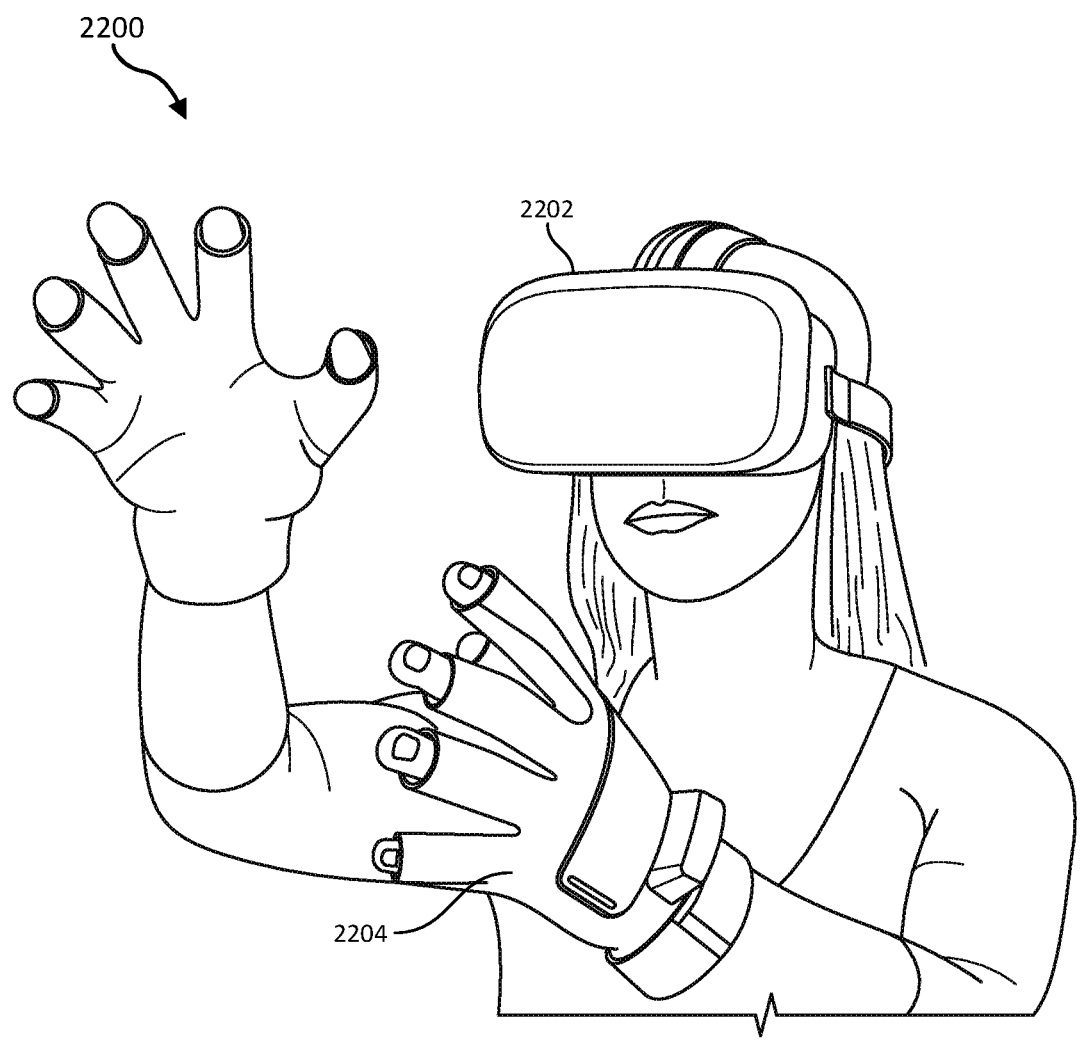
FIG. 22 is an illustration of an exemplary virtual-reality environment according to embodiments of this disclosure.

Haptic wearable apparatus, such as those shown in and described in connection with FIG. 21, may be implemented in a variety of types of artificial-reality systems and environments. FIG. 22 shows an example artificial reality environment 2200 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Figure 20:
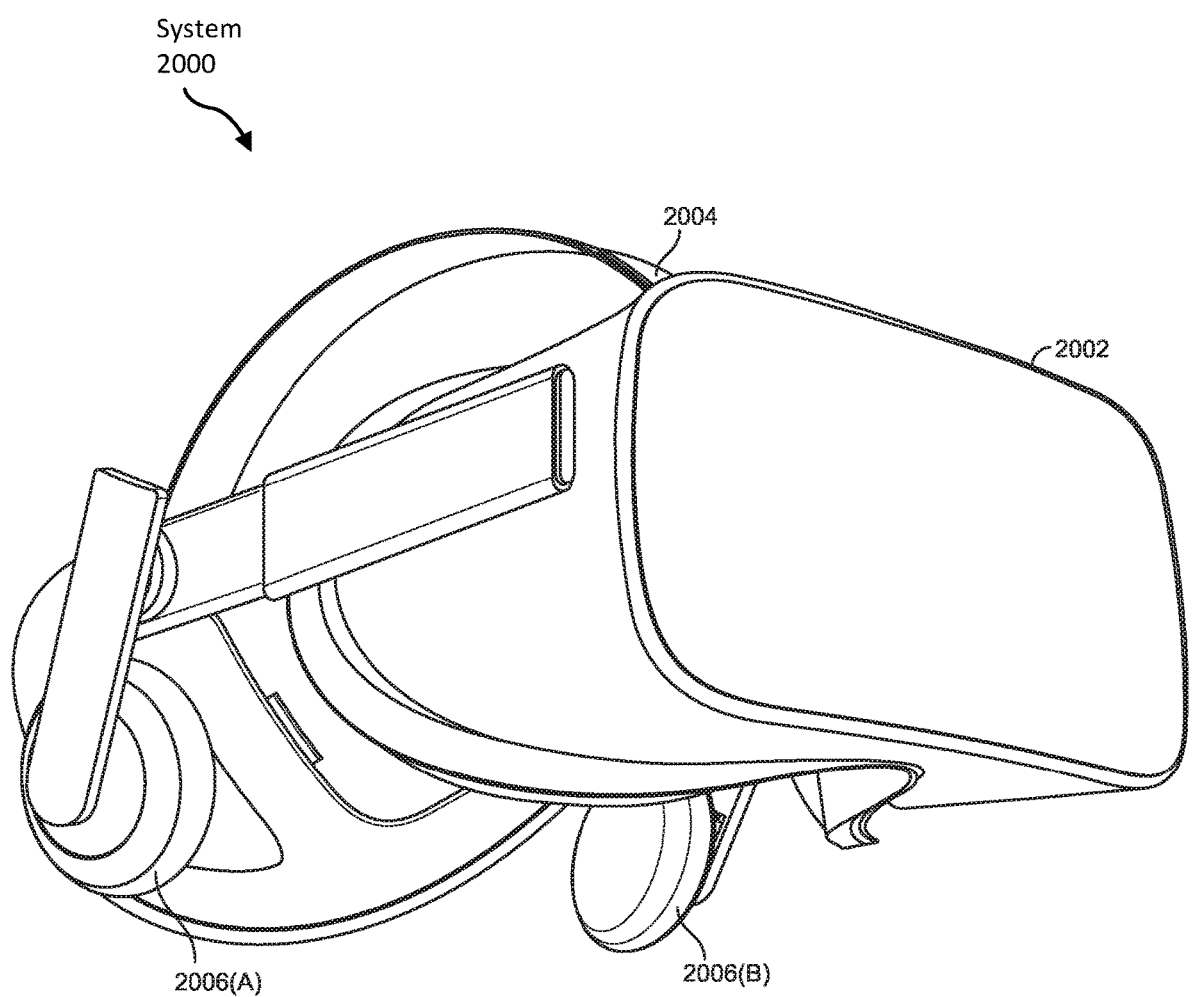
FIG. 20 is an illustration of an exemplary virtual-reality headset that may be used in connection with embodiments of this disclosure.

Head-mounted display 2202 generally represents any type or form of virtual-reality system, such as virtual-reality system 2000 in FIG. 20. Haptic device 2204 generally represents any type or form of wearable apparatus, worn by a user of an artificial reality system, that provides haptic feedback to the user to give the user the perception that he or she is physically engaging with a virtual object. In some embodiments, haptic device 2204 may provide haptic feedback by applying vibration, motion, and/or force to the user. For example, haptic device 2204 may limit or augment a user's movement. To give a specific example, haptic device 2204 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 2204 to send action requests to a console. Examples of action requests include, without limitation, requests to start an application and/or end the application and/or requests to perform a particular action within the application.

Figure 23:
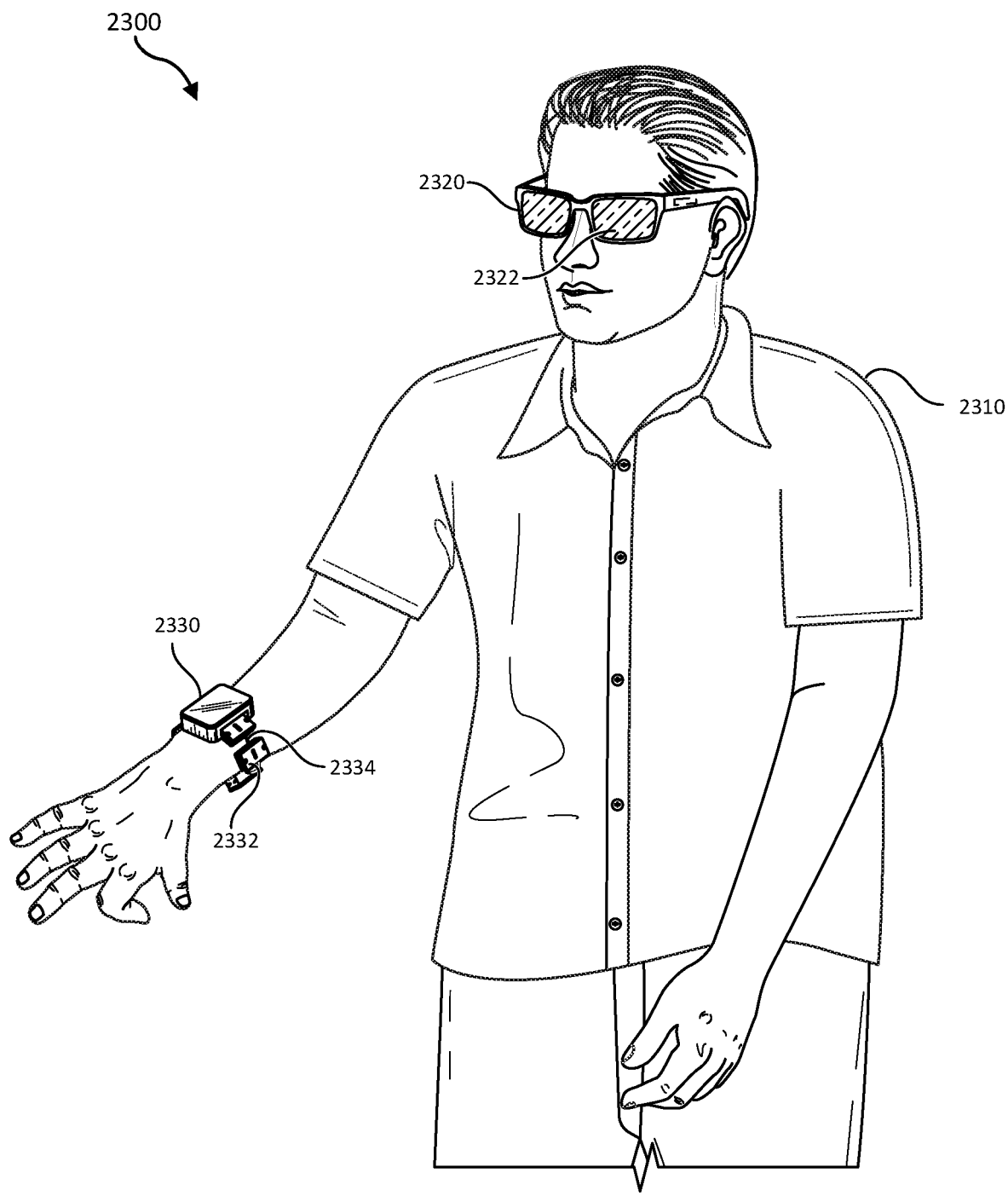
FIG. 23 is an illustration of an exemplary augmented-reality environment according to embodiments of this disclosure.

While haptic interfaces may be used with virtual-reality systems, as shown in FIG. 22, haptic interfaces may also be used with augmented-reality systems, as shown in FIG. 23. FIG. 23 is a perspective view of a user 2310 interacting with an augmented-reality system 2300. In this example, user 2310 may wear a pair of augmented-reality glasses 2320 that may have one or more displays 2322 and that are paired with a haptic device 2330. In this example, haptic device 2330 may be a wristband that includes a plurality of band elements 2332 and a tensioning mechanism 2334 that connects band elements 2332 to one another.

One or more of band elements 2332 may include any type or form of actuator suitable for providing haptic feedback. For example, one or more of band elements 2332 may be configured to provide one or more of various types of cutaneous feedback, including vibration, force, traction, texture, and/or temperature. To provide such feedback, band elements 2332 may include one or more of various types of actuators. In one example, each of band elements 2332 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 2110, 2120, 2204, and 2330 may include any suitable number and/or type of haptic transducer, sensor, and/or feedback mechanism. For example, haptic devices 2110, 2120, 2204, and 2330 may include one or more mechanical transducers, piezoelectric transducers, and/or fluidic transducers. Haptic devices 2110, 2120, 2204, and 2330 may also include various combinations of different types and forms of transducers that work together or independently to enhance a user's artificial-reality experience. In one example, each of band elements 2332 of haptic device 2330 may include a vibrotactor (e.g., a vibrotactile actuator) configured to vibrate in unison or independently to provide one or more of various types of haptic sensations to a user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed (e.g., eye-tracking sensor data, sensor data, or other data), transform the data (e.g., into one or more of gaze direction, finger joint angle, gesture performed, object viewed, or other vision or user input parameter), output a result of the transformation to perform a function (e.g., modify an augmented reality environment, modify a real environment, modify an operational parameter of a real or virtual device, provide a control signal to an apparatus such as an electronic device (e.g., a computer, vehicle, or other apparatus), use the result of the transformation to perform a function, and/or store the result of the transformation to perform a function (e.g., in a memory device). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein may be considered in all respects illustrative and not restrictive. Reference may be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An apparatus, comprising:
    a membrane;
    a first electrode supported by the membrane;
    a second electrode;
    a dielectric fluid located within a fluid enclosure at least partially defined by the membrane; and
    a controller configured to apply an electrical potential between the first electrode and the second electrode, wherein:
    the membrane comprises a dielectric material and an electrically conductive additive; and
    the membrane has a volume resistivity of between $10^8$ ohm.cm and $10^{12}$ ohm.cm.

2. The apparatus of claim 1, wherein the electrically conductive additive comprises at least one of a metal, an electrically conductive metal oxide, carbon, or an electrically conductive polymer.

3. The apparatus of claim 1, wherein the electrically conductive additive comprises at least one of fibers, rods, or particles.

4. The apparatus of claim 1, wherein at least a portion of the membrane is located between the first electrode and the dielectric fluid.

5. The apparatus of claim 1, wherein the membrane has a volume resistivity of between $10^9$ ohm.cm and $10^{11}$ ohm.cm.

6. The apparatus of claim 1, wherein the dielectric material comprises a glass or ceramic.

7. The apparatus of claim 1, wherein the membrane comprises a fluoropolymer.

8. The apparatus of claim 1, wherein the membrane comprises a copolymer of vinylidene difluoride.

9. The apparatus of claim 1, wherein the membrane comprises poly(vinylidene difluoride-trifluoroethylene-chlorotrifluoroethylene).

10. The apparatus of claim 1, wherein the membrane further comprises a toughener.

11. The apparatus of claim 10, wherein the toughener comprises polymer fibers or core-shell particles.

12. The apparatus of claim 1, wherein:
    the second electrode is supported by a second membrane; and
    the second membrane has a volume resistivity of between $10^8$ ohm.cm and $10^{12}$ ohm.cm.

13. The apparatus of claim 1, wherein the electrical potential reduces a separation between the first electrode and the second electrode and induces a flow of the dielectric fluid from between the first electrode and the second electrode.

14. The apparatus of claim 1, wherein the apparatus is a wearable apparatus configured to be worn by a user.

15. The apparatus of claim 14, wherein a flow of the dielectric fluid in response to the electric potential induces a haptic signal to the user when the apparatus is worn by the user.

16. The apparatus of claim 1, wherein the apparatus comprises a wristband or a glove.

17. The apparatus of claim 1, wherein the apparatus is an augmented reality apparatus or a virtual reality apparatus.

18. A method, comprising:
    fabricating a membrane comprising a dielectric material and an electrically conductive additive;
    depositing an electrode on the membrane; and
    assembling a transducer comprising the membrane, the electrode, a dielectric fluid, and a second electrode, wherein:
    at least a portion of the membrane is located between the electrode and the dielectric fluid;
    the second electrode is supported by a second membrane; and
    at least a portion of the second membrane is located between the second electrode and the dielectric fluid.

19. The method of claim 18, wherein:
    the membrane has a volume resistivity of between $10^8$ ohm.cm and $10^{12}$ ohm.cm.

20. A method, comprising:
    applying an electrical signal between a first electrode and a second electrode within a transducer;

electrostatically adhering a first membrane adjacent the first electrode to a second membrane adjacent the second electrode using the electrical signal; and expelling dielectric fluid from between the first electrode and the second electrode to provide actuation of the transducer, wherein:

the first membrane comprises a dielectric material and an electrically conductive additive; and the first membrane has a volume resistivity of between $10^8$ ohm.cm and $10^{12}$ ohm.cm.

* * * * *